(12) United States Patent
Zhao et al.

(10) Patent No.: US 12,127,214 B2
(45) Date of Patent: Oct. 22, 2024

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Zhenshan Zhao, Guangdong (CN); Qianxi Lu, Guangdong (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 280 days.

(21) Appl. No.: 17/506,511

(22) Filed: Oct. 20, 2021

(65) Prior Publication Data

US 2022/0046698 A1    Feb. 10, 2022

Related U.S. Application Data

(63) Continuation of application No. PCT/CN2019/085324, filed on Apr. 30, 2019.

(51) Int. Cl.
*H04W 72/00* (2023.01)
*H04W 72/23* (2023.01)

(52) U.S. Cl.
CPC .................. *H04W 72/23* (2023.01)

(58) Field of Classification Search
None
See application file for complete search history.

(56) References Cited

U.S. PATENT DOCUMENTS

| | | | |
|---|---|---|---|
| 2017/0019886 A1* | 1/2017 | Patel | H04W 72/23 |
| 2017/0150501 A1* | 5/2017 | Park | H04W 72/0446 |
| 2017/0215183 A1 | 7/2017 | Gulati et al. | |
| 2017/0230996 A1* | 8/2017 | Li | H04W 72/20 |
| 2017/0290028 A1 | 10/2017 | Lee et al. | |
| 2018/0049217 A1* | 2/2018 | Dinan | H04W 72/569 |
| 2018/0049224 A1* | 2/2018 | Dinan | H04W 4/44 |
| 2018/0139734 A1 | 5/2018 | Babaei et al. | |
| 2018/0160445 A1 | 6/2018 | Babaei et al. | |

(Continued)

FOREIGN PATENT DOCUMENTS

| | | |
|---|---|---|
| CN | 104854947 A | 8/2015 |
| CN | 105191178 A | 12/2015 |
| CN | 105264921 A | 1/2016 |

(Continued)

OTHER PUBLICATIONS

Decision of Refusal for Japanese Application No. 2021-563379 issued Jan. 27, 2023. 7 pages with English translation.

(Continued)

*Primary Examiner* — Gerald A Smarth
(74) *Attorney, Agent, or Firm* — Perkins Coie LLP

(57) ABSTRACT

A wireless communication method, a terminal device and a network device are disclosed. The method includes: where there is sidelink data to be transmitted, a terminal device sending, on a transmission resource authorized by an uplink configuration, first data to a network device, wherein the first data is used for requesting that the network device allocates a sidelink transmission resource for the terminal device.

20 Claims, 4 Drawing Sheets

(56) References Cited

U.S. PATENT DOCUMENTS

2018/0295646 A1 10/2018 Faurie et al.
2021/0400681 A1* 12/2021 Wang ............... H04W 72/0453

FOREIGN PATENT DOCUMENTS

| | | | | |
|---|---|---|---|---|
| CN | 106165510 A | 11/2016 | | |
| CN | 106507497 A | 3/2017 | | |
| CN | 106576079 A | 4/2017 | | |
| CN | 106954272 A | 7/2017 | | |
| CN | 107371260 A | 11/2017 | | |
| CN | 108886781 A | 11/2018 | | |
| JP | 2018029323 A | 2/2018 | | |
| WO | 2017118229 A1 | 7/2017 | | |
| WO | 2017172479 A1 | 10/2017 | | |
| WO | 2018145296 A1 | 8/2018 | | |
| WO | WO-2019197025 A1 * | 10/2019 | ........... | H04B 7/0456 |
| WO | WO-2020188831 A1 * | 9/2020 | ............... | H04L 1/08 |

OTHER PUBLICATIONS

Examination Report for European Application No. 19927396.2 issued Dec. 6, 2022. 7 pages.
First Office Action for Chinese Application No. 202301160066696.0 issued Jan. 19, 2023. 14 pages with English translation.
Huawei, HiSilicon, Sidelink resource allocation mode 2 for NR V2X, 3GPP TSG RAN WG1 Meeting #96bis R1-1903947, Xi'an, China, Apr. 8-12, 2019.
Intel Corporation, Network controlled sidelink resource allocation design for NR V2X communication, 3GPP TSG RAN WG1 Meeting #96bis, R1-1904295, Xi'an, China, Apr. 8-12, 2019.
Samsung, On NR V2X Mode 1 Resource Allocation, 3GPP TSG RAN WG1 #96bis, R1-1904420, Xi'an, China, Apr. 8-12, 2019.
LG Electronics, Discussion on resource allocation for NR sidelink Mode 1, 3GPP TSG RAN WG1 #96bis, R1-1905438, Xi'an, China, Apr. 8-12, 2019.
Ericsson, Uu-based sidelink resource allocation, 3GPP TSG-RAN WG1 Meeting #96bis, R1-1905476, Xi'an, China, Apr. 8-12, 2019.
International Search Report issued Jan. 9, 2020 of PCT/CN2019/085324 (4 pages).
Ericsson "Feature lead summary #2 on Resource allocation for NR sidelink. Mode 1" R1-1905834; 3GPP TSG-RAN WG1 Meeting #96bis; Xi'an, China; Apr. 8-12, 2019. 20 pages.
Notice of Reasons for Refusal for Japanese Application No. 2021-563379 issued Sep. 13, 2022. 6 pages with English translation.
NTT Docomo, Inc. "NR Sidelink Resource Allocation Mechanism Mode 1" R1-1905422; 3GPP TSG RAN WG1 #96bis; Xi'an, China; Apr. 8-12, 2019. 5 pages.
Second Office Action of the Chinese application No. 202111410394.4, issued on Jun. 1, 2023. 12 pages with English translation.
Second Office Action of the European application No. 19927396.2, issued on Jun. 9, 2023. 8 pages.
Reconsideration Report by Examiner before Appeal of the JP application No. 2021-563379, issued on Jun. 6, 2023. 7 pages with English translation.
First Office Action of the Korean application No. 10-2021-7038291, issued on Aug. 14, 2023. 9 pages with English translation.
Ericsson, R1-1901212 "On PHY procedures to support unicast and groupcast on NR sidelink". 3GPP TSG-RAN WG1 Meeting # ah-1901 Taipei, Taiwan, Jan. 21-25, 2019. 11 pages.
3GPP "Study on Vehicle-to-Everything (Release 16)" 3GPP TR 38.885 V1.0.2 (Feb. 2019). 25 pages.

CATT "Discussion on physical layer structure in NR V2X" R1-1905351; 3GPP TSG RAN WG1 Meeting #96bis. 13 pages.
Examination Report for Indian Application No. 202127054318 issued Jun. 3, 2022. 6 pages with English translation.
Extended European Search Report for European Application No. 19927396.2 issued Mar. 23, 2022. 9 pages.
LG Electronics "Discussion on physical layer procedures for NR sidelink" R1-1905443; 3GPP TSG RAN WG1 Meeting #96bis; Xi'an, China; Apr. 8-12, 2019. 12 pages.
Vivo "Discussion on mode 1 allocation mechanism" R1-1904073; 3GPP TSG RAN WG1 #96bis; Xi'an, China; Apr. 8-12, 2019. 9 pages.
Second Office Action of the Korean application No. 10-2021-7038291, issued on Feb. 16, 2024. 11 pages with English translation.
Huawei, HiSilicon, R1-1903945, Sidelink reference signal design for NR V2X, 3GPP TSG RAN WG1 Meeting #96bis, Xi'an, China, Apr. 8-12, 2019. 12 pages.
Intel Corporation, R1-1904294, Sidelink Physical Structure for NR V2X Communication, 3GPP TSG RAN WG1 RAN1#96bis Xi'an, China, Apr. 8-12, 2019. 16 pages.
Intel Corporation, R1-1904299, Design of physical layer procedures for NR V2X sidelink communication, 3GPP TSG RAN WG1 RAN1#96bis Xi'an, China, Apr. 8-12, 2019. 11pages.
Ericsson, R1-1905475, PHY layer structure for NR sidelink, 3GPP TSG-RAN WG1 Meeting #96bis Xi'an, China, Apr. 8-12, 2019. 9 pages.
First Office Action for Japanese Application No. 2023-077741 issued May 10, 2024. 10 pages with English translation.
Fujitsu, "Discussion on physical layer structure for NR sidelink", R1-1905374, 3GPP TSG RAN WG1 #96bis Xi'an, China, Apr. 8-12, 2019. 12 pages.
Ericsson, "DMRS design for two-port PSSCH transmission", R1-1720122, 3GPP TSG RAN WG1 Meeting #91, Reno, NV, USA, Nov. 27-Dec. 1, 2017. 8 pages.
Nokia, Nokia Shanghai Bell, "Initial View on NR V2X Sidelink Physical Layer Structures and Procedures", R1-1809045, 3GPP TSG RAN WG1 Meeting #94 Gothenburg, Sweden, Aug. 20-24, 2018. 7 pages.
Fraunhofer HHI, Fraunhofer IIS, "Physical Layer Procedures for Unicast and Groupcast", R1-1901843, 3GPP TSG RAN WG1 Meeting #96 Athens, Greece, Feb. 25-Mar. 1, 2019. 8 pages.
OPPO, "Discussion of Uu-based sidelink resource allocation and configuration", R1-1902388, 3GPP TSG RAN WG1 #96 Athens, Greece, Feb. 25-Mar. 1, 2019. 6 pages.
InterDigital Inc., "Discussion On Uu-based Sidelink Resource Allocation and Configuration", R1-1902603, 3GPP TSG RAN WG1 #96 Athens, Greece, Feb. 25-Mar. 1, 2019. 5 pages.
Huawei, "Feature lead summary for AI 7.2.43: Uu-based sidelink resource allocation/configuration", R1-1903572, 3GPP TSG RAN WG1 Meeting #96 Athens, Greece, Feb. 25-Mar. 1, 2019. 12 pages.
MediaTek Inc., "On sidelink resource allocation mechanism", R1-1904494, 3GPP TSG RAN WG1 Meeting #96bis Xian, China, Apr. 8-12, 2019. 10 pages.
Spreadtrum Communications, "Discussion on physical layer procedures for sidelink", R1-1904794, 3GPP TSG RAN WG1 #96bis Xi'an, China, Apr. 8-12, 2019. 8 pages.
Hearing Notice for Indian Application No. 202127054318 issued May 14, 2024. 2 pages.
European Search Report for European Application No. 24166054.7 issued Jun. 27, 2024. 5 pages.

* cited by examiner

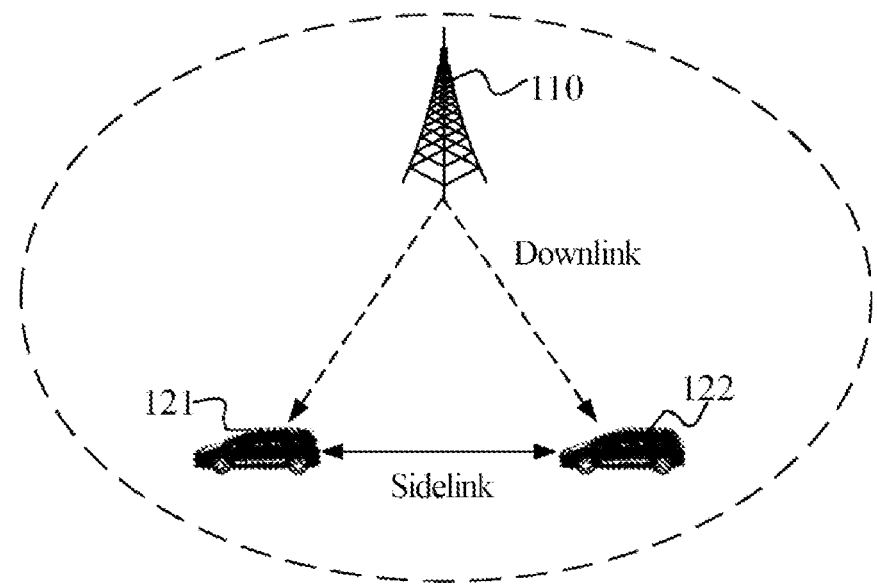
FIG. 1
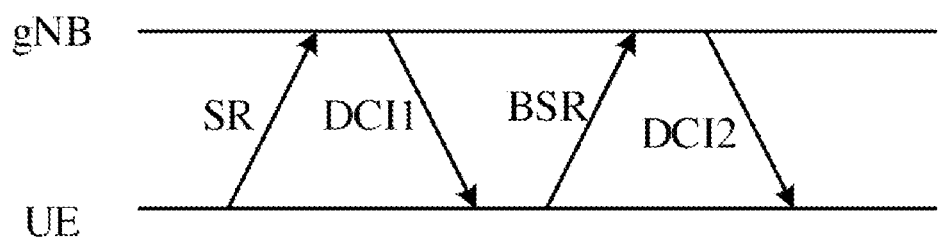
FIG. 2
200
In a case that there is sidelink data to be transmitted, a terminal device sends first data to a network device on transmission resources of an uplink configured grant, the first data is used for requesting the network device to allocate sidelink transmission resources for the terminal device — S210
FIG. 3

300

A terminal device sends second data to a network device, the second data is used for requesting the network device to allocate an uplink configured grant for the terminal device, and the uplink configured grant includes transmission resources and/or transmission parameters for uplink transmission — S310

A network device sends first configuration information and/or second configuration information to a terminal device, the first configuration information and/or second configuration information is used for configuring a sidelink configured grant, and the sidelink configured grant includes transmission resources and/or transmission parameters for sidelink transmission — S410

FIG. 7

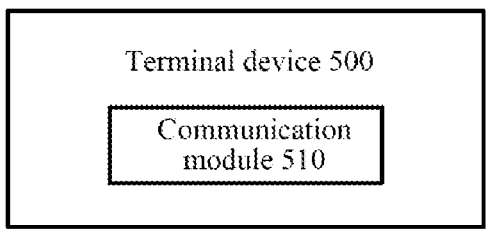

FIG. 8

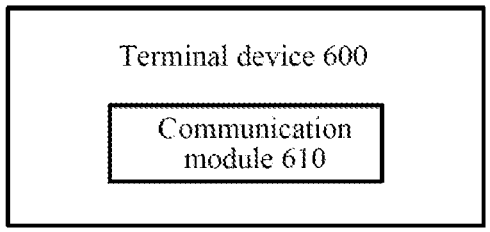

FIG. 9

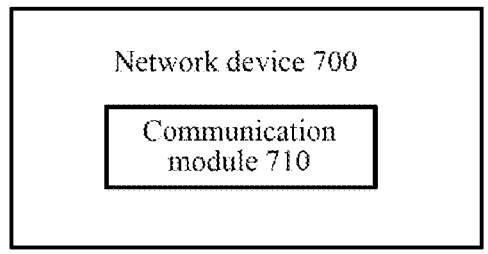

FIG. 10

WIRELESS COMMUNICATION METHOD, TERMINAL DEVICE AND NETWORK DEVICE

CROSS-REFERENCE TO RELATED APPLICATION

The present application is a continuation application of International PCT Application No. PCT/CN2019/085324, filed on Apr. 30, 2019, the entire content of which is hereby incorporated by reference.

TECHNICAL FIELD

Implementations of the present disclosure relate to the field of communication, and more particularly, to a wireless communication method and a terminal device.

BACKGROUND

In 3rd Generation Partnership Project (3GPP) Rel-14, a vehicle networking technology, i.e., a Vehicle to Everything (V2X) technology, is standardized, and two transmission modes, mode A and mode B, are defined.

Specifically, in mode A, transmission resources of a vehicle-mounted terminal are allocated by a base station, and the vehicle-mounted terminal sends data on a sidelink according to the resources allocated by the base station. The base station may allocate the resources for single transmission, for the terminal, or may allocate the resources for semi-statical transmission for the terminal. In mode B, the vehicle-mounted terminal selects the transmission resources on sidelink resources autonomously. Specifically, the vehicle-mounted terminal acquires available transmission resources in a resource pool in a sensing way, or the vehicle-mounted terminal selects randomly a transmission resource from the resource pool.

In a Vehicle to Everything (V2X) system of New Radio (NR), a transmission mode, i.e., mode A described above, in which a network device allocates sidelink transmission resources for a terminal, is also supported. When there is sidelink data to be transmitted by the terminal, the terminal can apply for the sidelink transmission resources from the network. Specifically, the terminal device can request the network device to allocate the sidelink transmission resources for the terminal by sending a scheduling request (SR) and a buffer status report (BSR) to the network device successively. Such resource request way results in a larger transmission delay, which is usually greater than 10 ms, while the NR-V2X system needs to support a lower delay requirement, such as 1-3 ms, so the delay requirement of the NR-V2X system cannot be met.

SUMMARY

Implementations of the present disclosure provide a wireless communication method and terminal device, which are beneficial to reducing the sidelink transmission delay.

In a first aspect, there is provided a wireless communication method including: sending, by a terminal device, first data to a network device on transmission resources of an uplink configured grant when there is sidelink data to be transmitted, wherein the first data is used for requesting the network device to allocate sidelink transmission resources for the terminal device.

In a second aspect, there is provided a wireless communication method including: sending, by a network device, first configuration information and/or second configuration information to a terminal device, wherein the first configuration information and/or second configuration information is used for configuring a sidelink configured grant, and the sidelink configured grant comprises transmission resources and/or transmission parameters for sidelink transmission.

In a third aspect, there is provided a wireless communication method including: sending, by a terminal device, second data to a network device, wherein the second data is used for requesting the network device to allocate an uplink configured grant for the terminal device, and the uplink configured grant includes transmission resources and/or transmission parameters for uplink transmission.

In a fourth aspect, there is provided a terminal device used for performing the method according to the first aspect described above or any possible implementation thereof. Specifically, the terminal device includes units for performing the method according to the first aspect described above or any possible implementation thereof or units for performing the method according to the third aspect described above or any possible implementation thereof.

In a fifth aspect, there is provided a network device including a processor and a memory. The memory is used for storing a computer program, and the processor is used for invoking and running the computer program stored in the memory to perform the method according to the second aspect described above or various implementations thereof.

In a sixth aspect, there is provided a chip used for implementing the methods according to the first to third aspects described above or various implementations thereof.

Specifically, the chip includes a processor used for invoking and running a computer program from a memory, so that a device having the chip installed thereon performs the methods according to the first to third aspects described above or various implementations thereof.

In a seventh aspect, there is provided a computer readable storage medium for storing a computer program that causes a computer to perform the methods according to the first to third aspects described above or various implementations thereof.

In an eighth aspect, there is provided a computer program product including computer program instructions that cause a computer to perform the methods according to the first to third aspects described above or various implementations thereof.

In a ninth aspect, there is provided a computer program, which, when running on a computer, causes the computer to perform the methods according to the first to third aspects described above or various implementations thereof.

Based on the above technical solution, in the case that there is sidelink data to be transmitted, the terminal device can send the first data to the network device on the transmission resources of the uplink configured grant allocated by the network device, and request the network device to allocate the sidelink transmission resources for the terminal device through the first data, so that the request for the sidelink resources only needs one piece of information, thereby helping to avoid the sidelink transmission delay caused by the request for the resources made by the terminal device through an SR and a BSR.

BRIEF DESCRIPTION OF DRAWINGS

FIG. 1 is a schematic diagram of an architecture of a communication system in accordance with an implementation of the present disclosure.

FIG. 2 is a schematic interaction diagram of a terminal device requesting for sidelink transmission resources.

FIG. 3 is a schematic diagram of a wireless communication method in accordance with an implementation of the present disclosure.

FIG. 6 is a schematic diagram of another wireless communication method in accordance with an implementation of the present disclosure.

FIG. 7 is a schematic diagram of still another wireless communication method in accordance with an implementation of the present disclosure.

FIG. 8 is a schematic block diagram of a terminal device in accordance with an implementation of the present disclosure.

FIG. 9 is a schematic block diagram of another terminal device in accordance with an implementation of the present disclosure.

FIG. 10 is a schematic block diagram of a network device in accordance with an implementation of the present disclosure.

DETAILED DESCRIPTION

Figure 4:
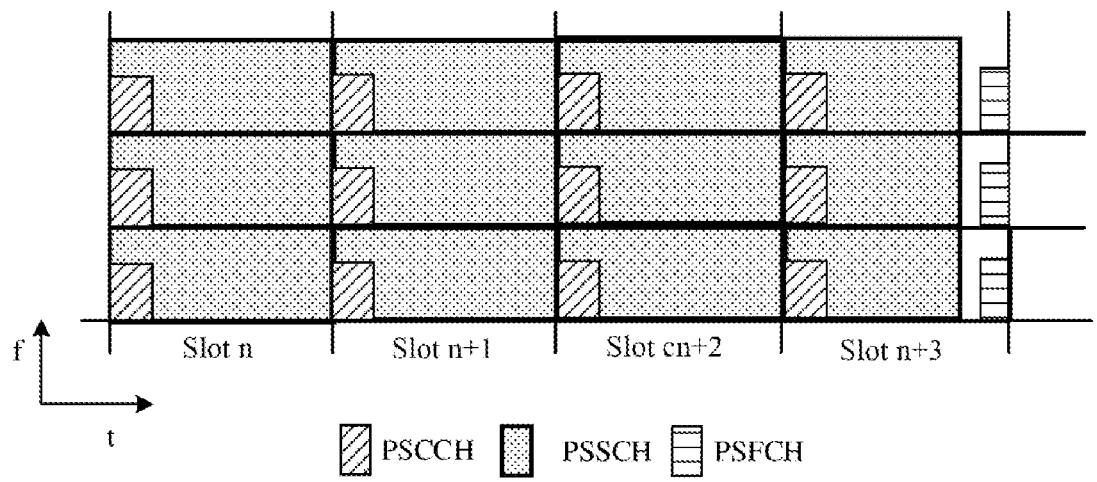
FIG. 4 is a schematic diagram of a feedback mode of a sidelink feedback channel.

Technical solutions in implementations of the present disclosure will be described below with reference to the drawings in the implementations of the present disclosure. It is apparent that the implementations described are just some of the implementations of the present disclosure, but not all of the implementations of the present disclosure. According to the implementations of the present disclosure, all other implementations achieved by a person of ordinary skill in the art without making inventive efforts are within the protection scope of the present disclosure.

It should be understood that the technical solutions of the implementations of the present disclosure may be applied to a Device-to-Device (D2D) communication system, such as a vehicle networking system that performs D2D communication based on Long Term Evolution (LTE), or an NR-V2X system. Unlike a manner in which communication data is received or sent between terminals in a traditional LTE system through a network device (e.g., a base station), a vehicle networking system adopts a manner in which the terminals communicate with each other directly, and thus it has a higher spectral efficiency and a lower transmission delay.

Optionally, a communication system on which a vehicle networking system is based may be a Global System of Mobile communication (GSM) system, Code Division Multiple Access (CDMA) system, Wideband Code Division Multiple Access (WCDMA) system, General Packet Radio Service (GPRS) system, an LTE system, LTE Frequency Division Duplex (FDD) system, LTE Time Division Duplex (TDD) system, Universal Mobile Telecommunication System (UMTS) system, Worldwide Interoperability for Microwave Access (WiMAX) communication system, 5G New Radio (NR) system, etc.

A network device in the implementations of the present disclosure may be a base transceiver station (BTS) in a GSM system or CDMA system, or a NodeB (NB) in a WCDMA system, or an Evolutional Node B (eNB or eNodeB) in an LTE system, or a radio controller in a cloud radio access network (CRAN), or the network device may be a mobile switching center, a relay station, an access point, a vehicle-mounted device, a wearable device, a hub, a switch, a bridge, a router, a network side device (gNB) in a NR network, or a network device in a future evolved public land mobile network (PLMN).

The terminal device in the implementations of the present disclosure may be a terminal device capable of implementing D2D communication. For example, it may be a vehicle-mounted terminal device, or a terminal device in an LTE system (LTE UE), or a terminal device in an NR network (NR UE), or a terminal device in a future evolved Public Land Mobile Network (PLMN), which is not limited in the implementations of the present disclosure are not limited thereto.

FIG. 1 is a schematic diagram of an application scenario in accordance with an implementation of the present disclosure. FIG. 1 illustrates exemplarily one network device and two terminal devices. Optionally, a wireless communication system in an implementation of the present disclosure may include a plurality of network devices, and other numbers of terminal devices may be included within the coverage area of each network device, which is not limited in the implementations of the present disclosure.

Optionally, the wireless communication system may further include other network entities such as a Mobile Management Entity (MME), a Serving Gateway (S-GW), a Packet Data Network Gateway (P-GW), etc., or the wireless communication system may further include other network entities such as a Session Management Function (SMF), a Unified Data Management (UDM), an Authentication Server Function (AUSF), which is not limited in the implementations of the present disclosure.

In the vehicle networking system, the terminal devices can communicate with each other using mode A and mode B.

Specifically, a terminal device 121 may communicate with a terminal device 122 through a D2D communication mode. During D2D communication, the terminal device 121 communicates with the terminal device 122 directly through a D2D link, that is, a sidelink (SL). In mode A, transmission resources of the terminal devices are allocated by a base station, and the terminal devices can send data on the SL according to the resources allocated by the base station. The base station may allocate resources for single transmission for the terminal device, or may allocate resources for semi-statical transmission for the terminal device. In mode B, the terminal device selects the transmission resources on SL resources autonomously. Specifically, the terminal device acquires available transmission resources in a resource pool in a sensing way, or the terminal device selects randomly a transmission resource from the resource pool.

It should be understood that mode A and mode B described above illustrate only two transmission modes by way of example, and other transmission modes can be defined. For example, mode C and mode D are introduced into NR-V2X. In mode C, sidelink transmission resources of the terminal devices are allocated by the base station, and a manner in which the base station allocates the sidelink transmission resources by using mode A may be different from a manner in which the base station allocates the sidelink transmission resources by using mode C. For example, one of the manners may be a dynamic scheduling manner, the other is a semi-static scheduling manner or a semi-static plus dynamic scheduling manner. In mode D, the sidelink transmission resources of the terminal devices are selected by the terminal device.

A D2D communication technology may be applied to Vehicle to Vehicle (V2V) communication or Vehicle to Everything (V2X) communication. In the V2X communication, X may generally refer to any device with wireless receiving and sending capabilities, such as, but not limited to, a slow-moving wireless device, a fast-moving vehicle-mounted device, or a network control node with wireless transmitting and receiving capabilities. It should be understood that the implementations of the present disclosure are mainly applied to V2X communication scenarios, but may also be applied to any other D2D communication scenarios, which is not limited in the implementations of the present disclosure.

In the NR-V2X system, the terminal device may request for sidelink transmission resources from the network device. Specifically, as shown in FIG. 2, the terminal device may send an SR, which is used for requesting for uplink transmission resources, to the network device (gNB), and the network device may reply with downlink control information (DCI) 1 to the terminal device to allocate the uplink transmission resources for the terminal device. Then, the terminal device can send a BSR to the network device on the uplink transmission resources to request for the sidelink transmission resources. Further, the network device can allocate the sidelink transmission resources for the terminal device through DCI2, so that the terminal device can perform sidelink transmission on the sidelink transmission resources allocated by the network device.

It can be seen that four steps are required for the terminal device to request for the sidelink transmission resources from the network device, and the transmission delay is large, so the NR-V2X system's requirements for the delay cannot be met.

In view of this, an implementation of the present disclosure provides a technical solution, which can reduce the delay of the request for the sidelink transmission resources.

FIG. 3 is a schematic flow chart of a wireless communication method in accordance with an implementation of the present disclosure. The method 200 may be performed by the terminal device in the communication system shown in FIG. 1. As shown in FIG. 3, the method 200 may include at least portion of the following contents.

In S210, in a case that there is sidelink data to be transmitted, a terminal device sends first data to a network device on transmission resources of an uplink configured grant, the first data being used for requesting the network device to allocate sidelink transmission resources for the terminal device.

Optionally, in an implementation of the present disclosure, the uplink configured grant, which are also referred to as grant-free transmission, may be semi-statically configured and/or dynamically configured transmission resources and transmission parameters, and the uplink configured grant may be used for uplink transmission of the terminal device.

Optionally, in an implementation of the present disclosure, according to a configuration way of the uplink configured grant, a type-1 configured grant and a type-2 configured grant may be included, or other types of configured grants may also be included.

Specifically, the type-1 configured grant may be configured by the network device through higher layer signaling, such as radio resource control (RRC) signaling. Specifically, the RRC signaling may include transmission resources and/or transmission parameters for uplink transmission, which, for example, may include, but is not limited to, at least one of: time domain resources, frequency domain resources, a demodulation reference signal (DMRS), power control information, a modulation and coding scheme (MCS), a waveform, a redundancy version (RV), the number of repetitions, frequency hopping information, and the number of HARQ processes, which are used for uplink transmission. After receiving the RRC signaling including the type-1 configured grant, the terminal device can perform uplink transmission on the transmission resources of the type-1 configured grant using the transmission parameters of the type-1 configured grant.

The type-2 configured grant can adopt a two-step resource configuration way. First, the network device configures, through higher layer signaling (e.g., RRC signaling), part of the transmission resources and transmission parameters, which can specifically include, but are not limited to, at least one of: a period of time frequency resources, open-loop power control information, a waveform, a redundancy version, the number of repetitions, frequency hopping information, and the number of HARQ process, and then activates uplink transmission of the type-2 configured grant through DCI while configuring other transmission resources and transmission parameters including time domain resources, frequency domain resources, a DMRS and an MCS. After receiving high-level parameters, the terminal device cannot use immediately the transmission resources and transmission parameters configured by the high-level parameters for uplink transmission, but needs to perform uplink transmission only after the corresponding DCI activation is received and other transmission resources and transmission parameters are configured. Moreover, the network device can deactivate the type-2 configured grant through the DCI, and after receiving the DCI for deactivation, the terminal device can no longer use the transmission resources and transmission parameters of the type-2 configured grant for uplink transmission.

Optionally, the uplink configured grant in an implementation of the present disclosure may be the aforementioned type-1 configured grant or type-2 configured grant, and the uplink configured grant may be configured by the network device for the terminal device autonomously or configured based on the request of the terminal device. The specific realization is described in detail in implementation 2.

In an implementation of the present disclosure, when there are sidelink transmission resources to be transmitted, the terminal device may send the first data to the network device on the transmission resources of the uplink configured grant, and request the network device to allocate the sidelink transmission resources through the first data. Further, the network device may allocate the corresponding sidelink transmission resources for the terminal device based on the request of the terminal device. Optionally, the network device may allocate the sidelink transmission resources for single transmission, for the terminal device. For example, the network device may allocate the sidelink transmission resources for single transmission, for the terminal device through the DCI, or the network device may also allocate sidelink resources for the semi-statical transmission, which are also referred to as a sidelink configured grant, for the terminal device. The sidelink configured grant may include transmission resources and/or transmission parameters for sidelink transmission.

Similar to the resource configuration way of the uplink configured grant, the sidelink configured grant can also be configured through higher layer signaling (corresponding to the resource configuration way of the type-1 configured grant) or through higher layer signaling and DCI (corresponding to the resource configuration way of the type-2 configured grant), or can also be configured in other ways, which is not limited in the implementations of the present disclosure.

Optionally, in some implementations, the first data may include resource request auxiliary information, which is used to assist the network device in allocating appropriate transmission resources and/or transmission parameters for the terminal device. Specific contents of the resource request auxiliary information will be specifically described below, and this is regarded as Implementation 1.

Implementation 1

Optionally, in some implementations, the first data includes at least one of the following information.

1. First indication information, which is used for indicating that the first data is used to request for the sidelink transmission resources.

In a specific implementation, the first indication information is used for indicating that the first data is used to request for the sidelink configured grant.

The first indication information can be used by the network device to determine that the first data is used for requesting for the sidelink transmission resources. The first indication information indicates that the first data includes the resource request auxiliary information. The network device can distinguish the first data from other uplink data transmitted on the uplink configured grant through the first indication information, and further determine that the first data includes the resource request auxiliary information, so that the network device can analyze other information in the first data according to the first indication information and further configure the sidelink transmission resources according to the other information.

Optionally, in some implementations, the first indication information may be carried in one of the following ways.

The first way: a Radio Network Temporary Identity (RNTI) carried in the first data. For example, the network device can configure at least two RNTIs, including RNTI1 and RNTI2, for the terminal device, wherein RNTI1 is used to transmit normal uplink data and RNTI2 is used to transmit uplink data for requesting for the sidelink transmission resources, so that the network device can determine whether the uplink data is used for requesting for the sidelink transmission resources according to the RNTIs in the uplink data.

The second way: a scrambling sequence used for scrambling the first data. A scrambling operation can be performed through the scrambling sequence after the first data is encoded. The terminal device can carry the first indication information through a specific scrambling sequence. Thus, after receiving the first data, the network device can determine whether the first data is used for requesting for the sidelink transmission resources through the scrambling sequence used for scrambling the first data. If the scrambling sequence used for scrambling the first data is the specific scrambling sequence, the network device can determine that the first data is used for requesting for the sidelink transmission resource; otherwise, the first data is determined to be normal uplink data.

The third way: a specific information field of a media access control (MAC) control element (CE) of the first data.

2. A target address index, which is used to determine a receiving device of the sidelink data.

Optionally, the target address index is used to determine at least one of: a target address of V2X communication, Proximity-based service Destination (ProSe Destination), a group identifier and a terminal identifier.

For example, a set of target address indexes can be configured for the terminal device through pre-configuration information, network configuration information or according to application layer configuration. Each of the target address indexes corresponds to a target address. For example, in broadcast communication, a service type can correspond to a target address; in multicast communication, a group identifier of a communication group can correspond to a target address; in unicast communication, a terminal identifier of a receiving terminal can correspond to a target address. The network device can determine the target address corresponding to the uplink data by containing the target address index in the uplink data sent to the network device.

Optionally, in some implementations, the target address index may be an identifier of a terminal, indicating that the receiver of the sidelink data is a terminal device corresponding to the identifier; or the target address index may also be a group identifier, indicating that the receivers of the sidelink data are all terminal devices in a group corresponding to the group identifier; or the target address index is a service type identifier, indicating that the receivers of the sidelink data are all terminal devices which are interested in a service type corresponding to the service type identifier.

3. A logical channel group ID (LCG ID), which is used to indicate a logical channel group corresponding to the sidelink data, the LCG ID is used to indicate a buffer size carried in the first data refers to a buffer size of which LCG, that is, the sidelink data on a logical channel of which LCG needs to be transmitted.

4. A buffer size, which is used to indicate the total amount of sidelink data to be transmitted on the logical channel group.

The buffer size can be used to determine the total amount of side line data to be transmitted on all logical channels in the above logical channel group. For example, the buffer size can be an index value, and there is a mapping relationship between an index value and the amount of data. The mapping relationship can be pre-configured or network-configured. The terminal device indicates the size of the sidelink data to be transmitted through an index value, and the network device can determine the size of the sidelink data to be transmitted according to the index value and the mapping relationship.

Optionally, in some implementations, the first data further includes transmission parameters of the sidelink data to be transmitted. The transmission parameters can be used by the network device to allocate sidelink transmission resources meeting transmission requirements for the terminal device.

Optionally, in some implementations, the transmission parameters of the sidelink data to be transmitted include at least one of the following.

5. Priority information, which is used to indicate a priority of the sidelink data (or sidelink services) to be transmitted.

The priority information may include one or more pieces of priority information of the sidelink data to be transmitted.

If the data to be transmitted has a plurality of priorities, the priority information may include information of the plurality of priorities, or the priority information may include information of the highest priority of the plurality of priorities. For example, the logical channel group includes a plurality of logical channels, and there is sidelink data to be transmitted in each of the logical channels, and each of the logical channels may correspond to the same or different priorities. The priority information may include the priority information of the sidelink data to be transmitted in each of the logical channels, or the priority information may include the highest priority information among the priority information of the sidelink data to be transmitted in all logical channels in the logical channel group.

6. Period information, which used to indicate a period of the sidelink data or sidelink services to be transmitted.

For example, the period information can be 10 ms, 20 ms, 50 ms, 100 ms, 200 ms, 500 ms, 1000 ms, etc. When the sidelink services to be transmitted are periodic services, carrying the period information of the sidelink services to be transmitted in the first data helps the network device to allocate appropriate sidelink transmission resources.

7. Delay information, which is used to indicate delay requirements of the sidelink data or sidelink services to be transmitted.

Specifically, different sidelink services have different delay requirements, such as 3 ms, 5 ms, 10 ms, 20 ms, 100 ms, etc. The terminal device reports the delay information to the network device, which can be used by the network device to allocate appropriate sidelink transmission resources for the terminal device.

8. Reliability information, which is used to indicate reliability requirements of the sidelink data or sidelink services to be transmitted;

Specifically, different sidelink services have different reliability requirements, and the terminal device reports the reliability information to the network device, which can be used by the network device to allocate appropriate sidelink transmission parameters for the terminal device, for example, to allocate more transmission resources, lower MCS and more number of transmissions for services with high reliability requirements.

9. Transmission rate information, which is used to indicate a transmission rate of the sidelink data or sidelink services to be transmitted.

Specifically, different sidelink services have different transmission rate requirements, and the terminal device reports the transmission rate information to the network device, which is used by the network device to allocate appropriate sidelink transmission parameters for the terminal device, for example, to allocate more transmission resources, higher MCS and higher number of transmission layers for services with high transmission rate requirements.

10. A time deviation, which is used to indicate a time deviation of an expected arrival time of the sidelink data relative to a specific time boundary.

It may take some time to send the first data from the terminal device until the arrival of the sidelink data. By reporting the expected arrival time of the sidelink data to the network device, the network device can allocate appropriate sidelink transmission resources for the terminal device.

Optionally, the specific time boundary is a subframe with a subframe number of zero in a system frame with a system frame number (SFN) of zero.

Optionally, the expected arrival time of the sidelink data is a time at which the sidelink data is expected to arrive at the logical channel.

11. A data type identifier, which is used to determine whether the data to be transmitted is uplink data or sidelink data.

It should be understood that the transmission parameters of the sidelink data enumerated above are only examples. In the implementations of the present disclosure, the first data may also include other transmission parameters of the sidelink data to be transmitted, such as Quality of Service (QoS) requirements, service types, etc., which is not limited in the implementations of the present disclosure.

Therefore, in the implementations of the present disclosure, by carrying at least one piece of the above information in the first data, the network device can dynamically allocate the sidelink transmission resources or the sidelink configured grant for the terminal device according to the information carried in the first data, thus the terminal device can transmit the sidelink data on the sidelink resources allocated by the network device, thereby helping to reduce the transmission delay as compared to the four-step resource request process.

In the foregoing implementations, the uplink configured grant by which the terminal device sends the first data can be configured by the network device autonomously. For example, the network device can configure the uplink configured grant by using the configuration ways of the type-1 configured grant or type-2 configured grant described above. The uplink configured grant can also be configured by the network device according to the request of the terminal device in other implementations, and this is regarded as implementation 2, the specific implementation of which will be described below.

Implementation 2:

Optionally, the method 200 further includes: the terminal device sending second data to the network device, the second data being used for requesting the network device to allocate the uplink configured grant for the terminal device.

Optionally, in some implementations, the second data includes at least one of:

delay information, reliability information, transmission rate information, period information, data size, and a data type identifier, of data to be transmitted.

Optionally, the data type identifier of the data to be transmitted is used to determine whether the data to be transmitted is uplink data or sidelink data.

It should be understood that the specific meaning of transmission parameters in the second data can be described with reference to the detailed description of the relevant parameters in the first data, and will not be repeated herein for brevity.

Further, the network device may allocate the uplink transmission resources or configure the uplink configured grant for the terminal device according to the information included in the second data sent by the terminal device, so that the terminal device can request for the sidelink transmission resources from the network device by using the uplink transmission resources allocated by the network device, that is, the contents described in Implementation 1, thereby avoiding the problem of excessive transmission delay caused by sending the SR and BSR to the network device to request for the sidelink transmission resources.

Optionally, in some implementations, after receiving the first data sent by the terminal device, the network device can allocate the sidelink configured grant for the terminal device based on the information in the first data. Optionally, in other implementations, the network device can also allocate the sidelink configured grant for the terminal device directly, that is, the network device does not allocate the sidelink configured grant based on the information in the first data, so that the terminal device can transmit the sidelink data on the transmission resources of the sidelink configured grant directly, thereby avoiding the process of applying for the sidelink resources from the network device. The specific implementation in which the network device allocates the sidelink configured grant for the terminal device will be described below and is regarded as Implementation 3.

Implementation 3

Specifically, in Implementation 3, the terminal device receives first configuration information and/or second configuration information sent by the network device, the first configuration information and/or second configuration information being used to configure the sidelink configured grant.

For example, the terminal device may receive the first configuration information sent by the network device, and determine the sidelink configured grant according to the first configuration information. Optionally, the first configuration information may be RRC signaling. Such implementation is similar to the resource configuration way of the type-1 configured grant described above, and will not be repeated herein.

As another example, the terminal device may receive the first configuration information and the second configuration information sent by the network device, and determine the sidelink configured grant according to the first configuration information and the second configuration information. Optionally, the first configuration information may be RRC signaling and the second configuration information may be DCI, and part of transmission resources and part of transmission parameters are configured through the RRC signaling and the DCI respectively. Such implementation is similar to the resource configuration way of the type-2 configured grant described above, and will not be repeated herein.

The sidelink configured grant will be described below as a whole, and whether the transmission resources and transmission parameters in the sidelink configured grant are configured by one piece of configuration information or a plurality of pieces of configuration information is not limited.

Optionally, in some implementations, the sidelink configured grant includes transmission resources and/or transmission parameters of sidelink channels, wherein the sidelink channels include at least one of a sidelink control channel, a sidelink data channel, a sidelink feedback channel and a sidelink broadcast channel.

Optionally, the downlink control channel may be a physical downlink control channel (PDCCH). The sidelink data channel may include a physical sidelink shared channel (PSSCH). The sidelink feedback channel may include a physical sidelink feedback channel (PSFCH). The sidelink broadcast channel may include a physical sidelink broadcast channel (PSBCH) and a sidelink synchronization signal. The sidelink synchronization signal includes a sidelink primary synchronization signal (S-PSS) and a sidelink secondary synchronization signal (S-SSS).

Specific contents included in the transmission resources and transmission parameters of the sidelink data channel, sidelink control channel, sidelink feedback channel and sidelink broadcast channel will be described specifically below.

Optionally, transmission resources and transmission parameters of the sidelink data channel include at least one of:

time domain resource information of the sidelink data channel, frequency domain resource information of the sidelink data channel, demodulation reference signal (DMRS) information of the sidelink data channel, a transmission scheme of the sidelink data channel, the number of transmission layers of the sidelink data channel, a demodulation coding scheme (MCS) of the sidelink data channel, the number of retransmissions of the sidelink data channel, redundancy version information of the sidelink data channel, the number of hybrid automatic repeat request (HARQ) processes supported by the sidelink data channel, power control information of the sidelink data channel, the size of sidelink data capable of being transmitted on the sidelink data channel, a target address identifier of the sidelink data, priority information of the sidelink data and delay information of the sidelink data.

Optionally, the time domain resource information of the sidelink data channel includes at least one of:

period information of the sidelink data channel, information of a slot occupied by the sidelink data channel in each period, and information of a time domain symbol occupied by the sidelink data channel in a slot.

The period information of the sidelink data channel may be M slots, that is, transmission resources that can be used for transmitting the sidelink data are included in one or more of every M slots, wherein M is a positive integer. The information of a slot occupied by the sidelink data channel in each period can indicate which slots can be used to transmit the sidelink data in each period. Specifically, the information of a slot is a time domain offset relative to a specific time boundary, which, for example, is a subframe with a subframe number of zero in a wireless frame with a radio frame number of zero. The information of a time domain symbol occupied by the sidelink data channel in the slot indicates which time domain symbols in the slots that can be used to transmit the sidelink data can be used for transmitting the sidelink data.

It should be understood that the manner of indicating the time domain resources of the sidelink data channel as described above is only an example, and of course, other manners can also be used for indication, and will not be specifically limited in the implementations of the present disclosure.

Optionally, the frequency domain resource information of the sidelink data channel includes at least one of:

a starting frequency domain position of the sidelink data channel and the size of frequency domain resources occupied by the sidelink data channel.

Optionally, the size of the frequency domain resources of the sidelink data channel may adopt a sub-channel as granularity.

It should be understood that the manner of indicating the frequency domain resources of the sidelink data channel as described above is only an example, and of course, other manners, such as the starting frequency domain position and an ending frequency domain position, can also be used for indication, and will not be specifically limited in the implementations of the present disclosure.

Optionally, the DMRS information of the sidelink data channel includes at least one of:

a pattern of a DMRS of the sidelink data channel, scrambling information of the DMRS, and information of a time domain symbol occupied by the DMRS.

Scrambling information of the DMRS may be scrambling ID information of the DMRS.

If the DMRS of the sidelink data channel supports at least one pattern in the time domain, the network device may assign the sidelink data channel to use one or more patterns in the sidelink configured grant.

The information of a time domain symbol occupied by the DMRS is used for determining position and number information of time domain symbols occupied by the DMRS in the PSSCH.

Optionally, the transmission scheme of the sidelink data channel may be one or more of single-port transmission, space frequency block code (SFBC), cyclic delay diversity (CDD) and pre-coder cycling.

For example, if a sidelink supports at least one of the above transmission schemes, the network device may assign the sidelink to use one or more of the transmission schemes in the sidelink configured grant.

Optionally, in an implementation of the present disclosure, the number of transmission layers of the sidelink data channel may be one or more.

Optionally, the MCS of the sidelink data channel may include an MCS level used by the sidelink data channel.

Optionally, the number of retransmissions of the sidelink data channel is used to indicate the number of retransmissions of the sidelink data or to determine the maximum number of transmissions of the sidelink data.

Optionally, the redundancy version information of the sidelink data channel may include redundancy version information corresponding to one or more transmissions of the sidelink data. For example, if the sidelink data can be transmitted multiple times, the network device may configure the redundancy version information of each transmission. For example, the sequence of the redundancy version information is [0, 2, 3, 1], which corresponds to four transmissions respectively (one first transmission and three retransmissions). Their corresponding redundancy versions are 0, 2, 3, 1 respectively. Optionally, if the number of transmissions of the sidelink data is greater than 4, the above redundancy versions are reused.

Optionally, the power control information of the sidelink data channel may indicate the maximum transmit power of the sidelink data channel. For example, the transmit power of the sidelink data channel cannot exceed the maximum transmit power.

Optionally, the power control information of the sidelink data channel may indicate that the sidelink data channel performs power control based on downlink path loss and/or performs power control based on sidelink path loss.

The downlink path loss is path loss between the terminal device and the network device, and the sidelink path loss is path loss between a receiving terminal and a transmitting terminal.

For example, if the network device can configure the terminal device to perform power control according to the downlink path loss, the terminal device can determine first transmit power according to the downlink path loss, and further determine sidelink transmit power according to the first transmit power.

As another example, if the network device can configure the terminal device to perform power control according to the sidelink path loss, the terminal device can determine second transmit power according to the sidelink path loss, and further determine sidelink transmit power according to the second transmit power.

Optionally, the power control information of the sidelink data channel may also include QoS parameters, which may be priority information or reliability information. If a priority of the sidelink data is higher than the priority in the priority information, the terminal device can determine the sidelink transmit power according to the sidelink path loss; if the priority of the sidelink data is lower than the priority in the priority information, the terminal device determines the sidelink transmit power according to the downlink path loss. If reliability of the sidelink data is higher than the reliability in the reliability information, the terminal device determines the sidelink transmit power according to the sidelink path loss; if the reliability of the sidelink data is lower than the reliability in the reliability information, the terminal device determines the sidelink transmit power according to the downlink path loss.

Optionally, the power control information of the sidelink data channel may also indicate a power deviation or power spectral density deviation between the sidelink control channel and the sidelink data channel. The terminal device can determine transmit power of the sidelink control channel according to the transmit power of the sidelink data channel and the power deviation or the power spectral density deviation.

For example, there is a first deviation between the transmit power of the sidelink control channel and the transmit power of the sidelink data channel. The terminal device may determine the transmit power of the sidelink data channel plus a power value of the first deviation as the transmit power of the sidelink control channel.

Optionally, the first deviation may also be zero.

Optionally, the first deviation may be pre-configured, or configured by the network device.

As another example, there is a second deviation between a power spectral density of the sidelink control channel and a power spectral density of the sidelink data channel. The terminal device may determine the power spectral density of the sidelink data channel plus the second deviation as the power spectral density of the sidelink control channel, and further determine the transmit power of the sidelink control channel according to the power spectral density of the sidelink control channel and the size of the frequency domain resources of the sidelink control channel.

Optionally, the second deviation may be zero.

Optionally, the first deviation may be pre-configured, or configured by the network device.

Optionally, the size of the sidelink data capable of being transmitted on the sidelink data channel is the size of a transport block (TB) corresponding to the sidelink data.

Optionally, the target address identifier of the sidelink data may be an identifier of a terminal device, which can be used to indicate that only the sidelink data sent to the terminal device corresponding to the identifier can use the sidelink configured grant; or the target address index may also be a group identifier, which can be used to indicate that only the sidelink data sent to the terminal device in a group corresponding to the group identifier can use the sidelink configured grant; or the target address index is a service type identifier, which can be used to indicate that the sidelink configured grant can be used only when sending sidelink data corresponding to the service type identifier can use the sidelink configured grant.

Optionally, the priority information of the sidelink data can be used to determine the priority of the sidelink data that can use the sidelink configured grant. For example, only the sidelink data corresponding to the priority can be transmitted on the transmission resources of the sidelink configured grant, or only the sidelink data with a priority higher than or equal to the priority can be transmitted on the transmission resources of the sidelink configured grant.

For example, the priority information is a ProSe Per-Packet Priority (PPPP), a value range of which is [0,7], wherein the lower the value of the PPPP, the higher the priority. The priority information configured by the network device being 3 may indicate that only sidelink data with a PPPP of 3 can be transmitted on the sidelink configured grant, or sidelink data with a priority equal to or higher than 3, i.e., sidelink data with a PPPP of 0, 1, 2, 3, can be transmitted on the sidelink configured grant.

Optionally, the delay information of the sidelink data can be used to determine the delay of the sidelink data that can use the sidelink configured grant. For example, only the sidelink data corresponding to the delay information can be transmitted on the transmission resources of the sidelink configured grant; or only sidelink data, of which the delay requirement is higher than or equal to the delay information, can be transmitted on the transmission resources of the sidelink configured grant; or the delay information can be understood as the highest delay requirement that can be met by the transmission resources of the sidelink configured grant. In such case, the sidelink configured grant can be used to transmit sidelink data, of which the delay requirement is lower than or equal to the delay information.

For example, the delay information of the sidelink data channel of the sidelink configured grant being 10 ms may indicate that only sidelink services with a delay requirement of 10 ms, or sidelink services with a higher delay requirement (e.g., 3 ms or 5 ms) can be transmitted on the sidelink configured grant; or sidelink services with lower delay requirements (e.g., 10 ms, 15 ms) can be transmitted on the sidelink configured grant.

Optionally, transmission resources and transmission parameters of the sidelink control channel include at least one of:
time domain resource information of the sidelink control channel and frequency domain resource information of the sidelink control channel.

Optionally, the time domain resource information of the sidelink control channel includes at least one of:
period information of the sidelink control channel, information of a slot occupied by the sidelink control channel in each period, and information of a time domain symbol occupied by the sidelink control channel in a slot.

Here, the specific meaning of the time domain resource information of the sidelink control channel can be described with reference to the related description about the time domain resource information of the sidelink data channel in the foregoing implementations, and will not be repeated herein.

Optionally, the frequency domain resource information of the sidelink control channel includes at least one of:
a starting frequency domain position of the sidelink control channel and the size of frequency domain resources occupied by the sidelink control channel.

Here, the specific meaning of the frequency domain resource information of the sidelink control channel can be described with reference to the related description about the frequency domain resource information of the sidelink data channel in the foregoing implementations, and will not be repeated herein.

Optionally, transmission resources and transmission parameters of the sidelink feedback channel include at least one of:
time domain resource information of the sidelink feedback channel, frequency domain resource information of the sidelink feedback channel, a format of the sidelink feedback channel, whether sidelink feedback is supported, a feedback mode of sidelink feedback information, feedback granularity information of the sidelink feedback information, and a first threshold, wherein the first threshold is a distance threshold between a receiving terminal and a transmitting terminal or a sidelink reference signal received power (RSRP) threshold.

Optionally, the time domain resource information of the sidelink feedback channel includes at least one of:
a time offset of the sidelink feedback channel relative to the sidelink data channel, period information of the sidelink feedback channel, and information of a time domain symbol occupied by the sidelink feedback channel in a slot.

For example, when the time offset is K, if the sidelink data is sent in slot n, the feedback information of the sidelink data is sent in slot n+K, wherein K is an integer.

For example, the period information may be N, indicating that transmission resources for transmitting the sidelink feedback channel are included in one slot of every N slots. As shown in FIG. 4, N may be 4, indicating that the sidelink feedback information is fed back once every four slots. If the sidelink data is sent in slot n, slot n+1, slot n+2 and slot n+3, the feedback information of the sidelink data is sent in slot n+3.

Optionally, the frequency domain resource information of the sidelink feedback channel includes at least one of:
a starting frequency domain position of the sidelink feedback channel and the size of frequency domain resources occupied by the sidelink feedback channel.

Here, the specific meaning of the frequency domain resource information of the sidelink feedback channel can be described with reference to the related description about the frequency domain resource information of the sidelink data channel in the foregoing implementations, and will not be repeated herein.

Optionally, the format of the sidelink feedback channel is used to determine the format of the sidelink feedback channel. For example, two formats of the sidelink feedback channel, including a first feedback channel format and a second feedback channel format, which are predefined or network-configured, are used to determine whether the sidelink feedback channel uses the first feedback channel format or the second feedback channel format. For example, the system defines a short feedback channel and a long feedback channel. The short feedback channel indicates that the sidelink feedback channel occupies part of time domain symbols, which can be used for sidelink transmission, in one slot, and the long feedback channel indicates that the sidelink feedback channel occupies all of time domain symbols, which can be used for sidelink transmission, in one slot.

If the terminal device supports at least one format of the sidelink feedback channel, the network device may specify one or more of the supported formats of the sidelink feedback channel.

Optionally, whether the receiving device feeds back the sidelink feedback information can be determined according to whether sidelink feedback is supported. For example, if a configuration of the network device supports the sidelink feedback, the receiving device needs to send the sidelink feedback information, otherwise, it does not need to send the sidelink feedback information.

As an example but not limitation, the feedback mode of the sidelink feedback information includes at least one of:
feeding back only Negative ACKnowledgement (NACK), and feeding back ACKnowledgement (ACK)/NACK.

Optionally, the feedback mode of the sidelink feedback information may also include feeding back only ACK.

For the first feedback mode, that is, only NACK is fed back, the terminal device can feed back NACK when a specific condition is met and a detection result of the sidelink data is NACK; or if the specific condition is met and the detection result of the sidelink data is ACK, the sidelink feedback information is not sent; or if the specific condition is not met, no matter whether the detection result of the sidelink data is ACK or NACK, the sidelink feedback information is not sent.

Optionally, the specific condition may be determined according to a first threshold, which, for example, may be a distance threshold between a receiving terminal and a transmitting terminal or a reference signal received power (RSRP) threshold, or may be other parameters.

Accordingly, the specific condition may be that the distance between the receiving terminal and the transmitting terminal is less than the distance threshold; or RSRP between the receiving terminal and the transmitting terminal is greater than the RSRP threshold.

For the second feedback mode, i.e., ACK/NACK is fed back, the terminal device can feed back NACK when the detection result of the sidelink data is NACK, and feed back ACK when the detection result of the sidelink data is ACK.

The network device can configure the terminal device to perform the sidelink feedback by using the first feedback mode or the second feedback mode. Further, the terminal device can perform the sidelink feedback according to the configured feedback mode.

Figure 5:
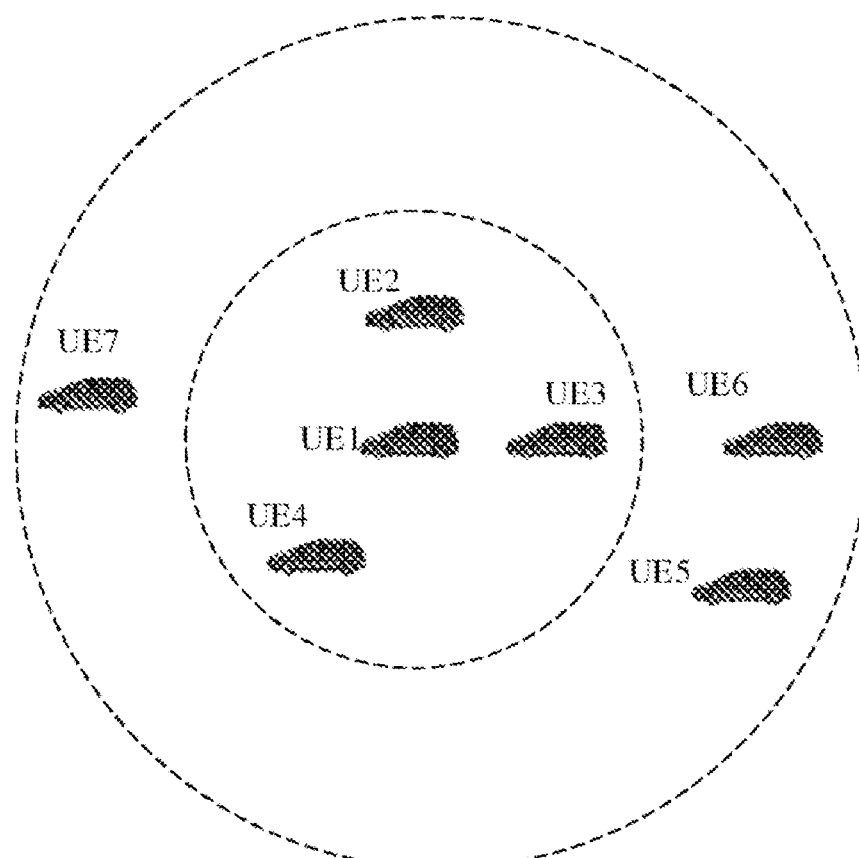
FIG. 5 is a schematic diagram of a distance between terminal devices of a communication group.

As shown in FIG. 5, UE1-UE7 constitute a communication group, wherein UE1 sends the sidelink data, that is, UE1 is the transmitting terminal, and UE2-UE7 receive the sidelink data, that is, UE2-UE7 are the receiving terminals. For the first feedback mode, when distances between the receiving terminals and the transmitting terminal are within a first distance range (corresponding to the first threshold), such as UE2, UE3 and UE4 in an inner circle, the receiving terminals perform feedback according to the detection result of the sidelink data. If the sidelink data is received correctly, the sidelink feedback information will not be sent; if the sidelink data is received incorrectly, NACK will be fed back. The terminal devices (e.g., UE5, UE6 and UE7) outside the first distance range do not send the sidelink feedback information. For the second feedback mode, all receiving terminals (UE2-UE7) in the communication group send the sidelink feedback information according to a receiving state of the sidelink data. If the sidelink data is received correctly, ACK will be fed back; if the sidelink data is received incorrectly, NACK will be fed back.

Optionally, in some implementations, the feedback granularity information of the sidelink feedback information is used to indicate that the feedback is performed based on a code block group (CBG) or based on a transport block, or the sidelink feedback can also be performed based on other packets. For example, the feedback granularity information of the sidelink feedback information can be 1-bit indication information. If the indication information is 1, indicating that the feedback is performed based on the CBG, then the receiving device performs the sidelink feedback for each CBG, or if the indication information is 0, indicating that the feedback is performed based on the transport block, then the receiving device may perform the feedback for the whole transport block. The specific feedback mode can be determined according to the feedback mode configured in the sidelink configured grant, or if this parameter is not configured, the feedback can be performed using the second feedback mode by default.

Optionally, transmission resources and transmission parameters of the sidelink broadcast channel include at least one of:

time domain resource information of the sidelink broadcast channel, frequency domain resource information of the sidelink broadcast channel and synchronization source information.

Optionally, the time domain resource information of the sidelink broadcast channel includes at least one of:

period information of the sidelink broadcast channel, the number of transmission resources of the sidelink broadcast channel in each period, and information of a slot occupied by the sidelink broadcast channel in each period.

The number of transmission resources of the sidelink broadcast channel in each period is used to determine how many transmission resources are used for transmitting one sidelink broadcast channel in one period of the sidelink broadcast channel.

Here, the specific meaning of the time domain resource information of the sidelink broadcast channel can be described with reference to the related description about the time domain resource information of the sidelink data channel in the foregoing implementations, and will not be repeated herein.

Optionally, the frequency domain resource information of the sidelink broadcast channel includes at least one of:

a starting frequency domain position of the sidelink broadcast channel, the size of frequency domain resources of the sidelink broadcast channel, a starting frequency domain position of the sidelink synchronization signal, and the size of frequency domain resources of the sidelink synchronization signal.

Here, the specific meaning of the frequency domain resource information of the sidelink broadcast channel can be described with reference to the related description about the frequency domain resource information of the sidelink data channel in the foregoing implementations, and will not be repeated herein. Optionally, the synchronization source information of the sidelink broadcast channel includes a synchronization source type, wherein the synchronization source type includes at least one of: global navigation satellite system, gNB, eNB, NR UE and LTE UE.

Optionally, in some implementations, the sidelink configured grant further includes transmission resources and transmission parameters of a sidelink reference signal.

Optionally, the transmission resources and transmission parameters of the sidelink reference signal include at least one of: whether the sidelink reference signal is included in the sidelink data channel, time domain resource information of the sidelink reference signal, and frequency domain resource information of the sidelink reference signal.

Optionally, the time domain resource information of the sidelink reference signal includes information of a time domain symbol occupied by the sidelink reference signal.

Optionally, the frequency domain resources of the sidelink reference signal include at least one of:

a frequency domain offset of the sidelink reference signal, the size of frequency domain resources occupied by the sidelink reference signal, and a frequency domain density of the sidelink reference signal.

Optionally, the frequency domain offset of the sidelink reference signal is an offset of a first subcarrier used for transmitting the sidelink reference signal in a resource block (RB) relative to subcarrier 0.

Optionally, the frequency domain density of the sidelink reference signal may be, for example, every subcarrier transmitting one sidelink reference signal, or every N subcarriers transmitting one sidelink reference signal, N being a positive integer greater than 1.

Optionally, the sidelink reference signal includes at least one of: a sidelink channel state information reference signal (CSI-RS), a sidelink phase tracking reference signal (PT-RS), or other reference signals for sidelink transmission.

Optionally, in some implementations, the sidelink configured grant includes at least one of:
- channel state information feedback indication information, which is used for indicating whether the receiving terminal needs to send channel state information to the transmitting terminal;
- channel measurement indication information, which is used for indicating whether the receiving terminal needs to perform channel measurement;
- channel measurement feedback indication information, which is used for indicating whether the receiving terminal needs to feed back a channel measurement result to the transmitting terminal; and
- transmission resource information, which is used for determining transmission resources used by the receiving terminal to send the channel state information or the channel measurement result to the transmitting terminal.

The channel state information includes at least one of: a channel quality indicator (CQI), rank indication (RI), and a precoding matrix indicator (PMI).

Optionally, the channel state information feedback indication information may be 1-bit indication information, a value of which is used to indicate whether the receiving terminal needs to send channel state information to the transmitting terminal.

The channel measurement indication information may also be 1-bit indication information, a value of which is used to indicate whether the receiving terminal needs to perform channel measurement. Optionally, the channel measurement indication information can also be implicitly determined according to the channel measurement feedback indication information. For example, if the receiving terminal is configured to send the channel measurement information to the transmitting terminal, it is indicated that the receiving terminal needs to perform channel measurement; otherwise, the receiving terminal does not need to perform channel measurement. In such case, the channel measurement indication information may not be needed.

Optionally, in an implementation of the present disclosure, the channel measurement result may be, for example, sidelink RSRP, sidelink reference signal receiving quality (RSRQ), and path loss information, for example, channel state information such as downlink path loss or sidelink path loss, which is not limited in the implementations of the present disclosure.

Optionally, the transmission resource information may be that there is a transmission resource used for determining that the receiving terminal sends the channel state information or the channel measurement result to the transmitting terminal, that is, the channel state information and the channel measurement result can be sent using the same transmission resource; or the transmission resource information may be that there are a plurality of transmission resources, that is, the channel state information and the channel measurement result can be sent using separate transmission resources.

Optionally, the sidelink configured grant also includes sidelink configured grant reception acknowledgement information, which is used to indicate whether the receiving device sends information, which indicates that the sidelink configured grant is received correctly, to the network device.

For example, the sidelink configured grant reception acknowledgement information may be 1-bit indication information. The bit being 0 indicates that the receiving terminal does not need to send acknowledgement information to the network device no matter whether the sidelink configured grant is received correctly; the bit being 1 indicates that the receiving terminal needs to send the acknowledgement information, which indicates whether the sidelink configured grant is received correctly, to the network device.

The sidelink configured grant reception acknowledgement information can be used by the network device to know whether the sidelink configured grant is received correctly by the terminal device, so that the network device can retransmit the sidelink configured grant if the terminal device does not receive the sidelink configured grant correctly, thereby helping to ensure timely transmission of the sidelink data.

Optionally, the sidelink configured grant further includes uplink resource indication information used for indicating uplink resources which are allocated by the network device for the terminal device and used for transmitting the sidelink configured grant reception acknowledgement information.

In some cases, if the network device allocates the uplink resource indication information for the terminal device, it can be implicitly indicated that the terminal device needs to send the sidelink configured grant reception acknowledgement information to the network device, at this point, the network device may no longer need to explicitly instruct the terminal device to send the sidelink configured grant reception acknowledgement information to the network device; or if the network device does not allocate the uplink resource indication information for the terminal device, it can be indicated that the terminal device does not need to send the side configured grant reception acknowledgement information to the network device. Optionally, by setting the uplink resource indication information to a specific value, it can be indicated that the terminal device does not need to send the side configured grant reception acknowledgement information to the network device.

Optionally, in an implementation of the present disclosure, the network device may also allocate a plurality of sidelink configured grants, which are used for sidelink data transmission, for the terminal device. For example, the network device may configure the plurality of sidelink configured grants through RRC signaling, or configure the plurality of sidelink configured grants through RRC signaling and DCI signaling. Specific configuration ways of the plurality of sidelink configured grants can be described with reference to the related descriptions of the foregoing implementations, and will not be repeated herein.

Because sidelink services may have different QoS requirements, and for example, the delay requirements may be 3 ms, 5 ms, 10 ms, 20 ms, 100 ms, etc., the network device can allocate transmission resources and transmission parameters of the plurality of the sidelink configured grants for the sidelink, to meet requirements of various sidelink services. Further, the network device may activate the corresponding sidelink configured grant of the plurality of sidelink configured grants according to the transmission parameters of the sidelink data in the first data. For example, if the delay requirement in the first data is 10 ms, the network device may activate the sidelink configured grant corresponding to the delay requirement of 10 ms.

Optionally, the network device may activate or deactivate at least one of the plurality of sidelink configured grants through RRC signaling.

For example, the network device may activate or deactivate the plurality of sidelink configured grants through RRC configuration or reconfiguration signaling. For example, the network device configures the plurality of sidelink configured grants through RRC reconfiguration signaling and activates the plurality of sidelink configured grants at the same time, and the sidelink configured grants configured before RRC reconfiguration will be deactivated.

For example, if the plurality of sidelink configured grants includes sidelink configured grant 1, sidelink configured grant 2 and sidelink configured grant 3, the currently activated sidelink configured grant is sidelink configured grant 1, and sidelink configured grant 2 and sidelink configured grant 3 are configured through the RRC reconfiguration signaling, then sidelink configured grant 2 and sidelink configured grant 3 are activated and sidelink configured grant 1 is deactivated at the same time.

Optionally, the network device may also activate or deactivate at least one of the plurality of sidelink configured grants through DCI signaling.

Specifically, the network device can configure the plurality of sidelink configured grants through RRC signaling and DCI signaling, and further, the network device can activate or deactivate any one of the plurality of sidelink configured grants through DCI signaling.

The manner of activating or deactivating the plurality of sidelink configured grants will be described below in conjunction with specific implementations.

Optionally, as an implementation, the DCI includes a first bitmap, and each bit in the first bit map is used to indicate to activate or deactivate a sidelink configured grant of the plurality of sidelink configured grants which is corresponding to the bit.

Specifically, each bit in the first bit bitmap corresponds to one sidelink configured grant, and the bit length M of the bit bitmap corresponds to M sidelink configured grants configured by the network device. If a certain bit in the first bit position is of a first value (e.g., 1), it is indicated that the sidelink configured grant corresponding to the bit is activated, and if the bit is of a second value (e.g., 0), it is indicated that the sidelink configured grant corresponding to the bit is deactivated.

Optionally, as another implementation, the DCI includes a first index for indicating a first sidelink configured grant, and the DCI or a physical downlink control channel (PDCCH) corresponding to the DCI includes second indication information for indicating to activate or deactivate the first sidelink configured grant.

For example, when the second indication information takes a first value, it is used to indicate to activate the first sidelink configured grant, and when the second indication information takes a second value, it is used to indicate to deactivate the first sidelink configured grant. If the second indication information is carried in a second information field of the DCI, the second information field may include 1 bit, and different values of the bit indicate to activate or deactivate the first sidelink configured grant respectively. For example, the value of the bit being 1 indicates to activate the first sidelink configured grant, and the value of the bit being 0 indicates to deactivate the first sidelink configured grant.

Optionally, the second information field in the DCI may be a newly-added information field in the DCI, or a reserved field in the DCI, or a reserved bit in the existing information field. Signaling overhead can be reduced by reusing the reserved information in the existing DCI for activating or deactivating the side configured grant.

As another example, if the second indication information is carried in a first information field in the DCI, and the first information field takes a specific value, it is indicated that the second indication information is used to indicate to activate the first sidelink configured grant; if the first information field takes other values than the specific value, it is indicated that the second indication information is used to indicate to deactivate the first sidelink configured grant.

Optionally, the specific value is an invalid state or a Null state of the first information field.

For example, the first information field may be a specific information field for semi-static scheduling activation in the PDCCH.

Optionally, in some implementations, the network device may also set more information fields in the DCI to specific values to indicate to activate or deactivate the corresponding sidelink configured grants. The specific ways for activating or deactivating are not limited in the implementations of the present disclosure.

Optionally, in some implementations, the second indication information is a scrambling sequence for scrambling the DCI.

That is, the second indication information can be carried by the scrambling sequence for scrambling the DCI. For example, if the network device can configure two scrambling sequences corresponding to activating and deactivating the sidelink configured grant respectively, the terminal device can determine whether to activate or deactivate the sidelink configured grant corresponding to the first index according to the scrambling sequence of the DCI.

Optionally, as yet another implementation, the DCI includes a second index and a third index. The second index corresponds to an index of the activated sidelink configured grant, and the third index corresponds to an index of the deactivated sidelink configured grant. That is, the network device can configure the indexes of both the activated and deactivated side configured grants.

Optionally, the second index is the first index in the DCI, and the third index is the second index in the DCI, or vice versa.

Optionally, in an implementation of the present disclosure, the network device may also configure at least two RNTIs, which are used for uplink transmission and sidelink data respectively. For example, the at least two RNTIs include a first RNTI and a second RNTI. The first RNTI may be a cell radio network temporary identity (C-RNTI) used by the terminal device to send uplink data to the network device, and the second RNTI may be a sidelink radio network temporary identity (SL-RNTI) used by the terminal device to send the side line data on the sidelink.

To sum up, Implementation 1 and Implementation 3 can be implemented separately or in combination, that is, the terminal device sends a sidelink resource request to the network device on the transmission resources of the uplink configured grant allocated by the network device (Implementation 1). Further, the network device can allocate the transmission resources of the sidelink configured grant for the terminal device based on the request (Implementation 3), and then the terminal device can send the sidelink data on the transmission resources of the sidelink configured grant allocated by the network device.

Optionally, Implementation 2 can be implemented alone or in combination with implementation 1, that is, the terminal device sends the second data to the network device (Implementation 2), and the network device allocates the uplink configured grant to the terminal device according to the second data, and when the terminal device has sidelink data to be transmitted, the terminal device sends the sidelink resource request to the network device on the uplink configured grant (Implementation 1).

Optionally, Implementation 1, Implementation 2 and Implementation 3 can be implemented in combination. For example, the terminal device sends the second data to the network device (Implementation 2), and the network device allocates the uplink configured grant to the terminal device according to the second data. When the terminal device has the sidelink data to be transmitted, it sends the sidelink resource request to the network device on the uplink configured grant (Implementation 1). Further, the network device allocates the sidelink configured grant for the terminal device according to auxiliary information carried in the resource request information (Implementation 3), such that the terminal device can send the sidelink data on the transmission resources of the sidelink configured grant allocated by the network device. Therefore, in an implementation of the present disclosure, the network device can allocate the transmission resources and transmission parameters of the sidelink configured grant for the terminal device, which can include the transmission resources and transmission parameters of the sidelink control channel, the sidelink data channel, the sidelink feedback channel and the sidelink broadcast channel, so that the terminal device can directly transmit the sidelink data on the transmission resources of the sidelink configured grant, thereby avoiding the process of reapplying sidelink resources from the network device and reducing the sidelink transmission delay.

FIG. 6 is a schematic flow chart of a wireless communication method 300 in accordance with another implementation of the present disclosure. Optionally, the method 300 may be performed by the terminal device in the communication system shown in FIG. 1. As shown in FIG. 6, the method 300 includes the following contents.

In S310, a terminal device sends second data to a network device, the second data being used for requesting the network device to allocate an uplink configured grant for the terminal device, and the uplink configured grant including transmission resources and/or transmission parameters for uplink transmission.

It should be understood that the method 300 may correspond to Implementation 2 of the foregoing implementations, and the specific implementation can be described with reference to the related descriptions of the foregoing implementations, and will not be repeated herein.

Therefore, in an implementation of the present disclosure, the terminal device can request for uplink transmission resources by sending the second data to the network device, and resource request auxiliary information is carried in the second data, and is used by the network device to allocate appropriate uplink transmission resources and transmission parameters for the terminal device.

Optionally, the second data includes at least one of: delay information, reliability information, transmission rate information, period information, the size and a data type identifier, of data to be transmitted.

Optionally, the data type identifier of the data to be transmitted is used to determine whether the data to be transmitted is uplink data or sidelink data.

Optionally, the method further includes: in the case that there is sidelink data to be transmitted, the terminal device sends first data to the network device on transmission resources of the uplink configured grant, the first data being used to request the network device to allocate sidelink transmission resources for the terminal device.

Optionally, the first data being used to request the network device to allocate the sidelink transmission resources for the terminal device includes: the first data being used to request the network device to allocate a sidelink configured grant for the terminal device, the sidelink configured grant including transmission resources and/or transmission parameters for sidelink transmission.

Optionally, the first data includes at least one of:
first indication information, which is used for indicating that the first data is used to request for the sidelink transmission resources, wherein, in a specific implementation, the first indication information is used for indicating that the first data is used to request for the sidelink configured grant;
a target address index, which is used for determining a receiving device of the sidelink data;
a logical channel group identifier, which is used for indicating a logical channel group corresponding to the sidelink data; and
a buffer size, which is used for indicating the total amount of sidelink data to be transmitted on the logical channel group.

Optionally, the first data also includes transmission parameters of the sidelink data to be transmitted.

Optionally, the transmission parameters of the sidelink data to be transmitted include at least one of:
priority information, period information, delay information, reliability information, transmission rate information, a time deviation, and a data type identifier.

Optionally, the priority information is the highest priority in a plurality of priorities of the sidelink data to be transmitted.

Optionally, the time deviation is used to indicate a time deviation of an expected arrival time of the sidelink data relative to a specific time boundary.

Optionally, the specific time boundary is a subframe with a subframe number of zero in a system frame with a system frame number of zero.

Optionally, the expected arrival time of the sidelink data is a time at which the sidelink data is expected to arrive at a logical channel.

Optionally, the data type identifier is used to determine whether the data to be transmitted is uplink data or sidelink data.

Optionally, the first indication information is carried by one of the following ways:
a radio network temporary identity (RNTI) carried in the first data;
a scrambling sequence used for scrambling the first data; and
a specific information field of a media access control (MAC) control element (CE) of the first data.

The wireless communication method in accordance with an implementation of the present disclosure is described in detail above from the perspective of the terminal device in conjunction with FIGS. 3 to 6, and a wireless communication method in accordance with another implementation of the present disclosure will be described in detail below from the perspective of the network device in conjunction with FIG. 7. It should be understood that the description of the network device corresponds to the description of the terminal device, and similar description may refer to the above description, which will not be repeated herein to avoid repetition.

FIG. 7 is a schematic flow chart of a wireless communication method 400 in accordance with another implementation of the present disclosure. The method 400 may be performed by the network device in the communication system shown in FIG. 1. As shown in FIG. 7, the method 400 includes the following contents.

In S410, a network device sends first configuration information and/or second configuration information to a terminal device, the first configuration information and/or second configuration information being used for configuring a sidelink configured grant, and the sidelink configured grant including transmission resources and/or transmission parameters for sidelink transmission.

It should be understood that the method 400 can correspond to Implementation 3 of the foregoing implementations, and the specific implementation can be described with reference to the related descriptions of the foregoing implementations, and will not be repeated herein.

Therefore, in an implementation of the present disclosure, the network device can allocate transmission resources and transmission parameters of the sidelink configured grant for the terminal device, so that the terminal device can directly transmit sidelink data on the transmission resources of the sidelink configured grant, thereby avoiding the process of reapplying sidelink resources from the network device and reducing the sidelink transmission delay.

Optionally, the sidelink configured grant allocated by the network device for the terminal device can be selected by the network device autonomously or based on a request of the terminal device. In such case, transmission resources and transmission parameters in the sidelink configured grant can be determined according to resource request replication information in first data of the terminal device.

Optionally, the sidelink configured grant includes at least one of: transmission resources and/or transmission parameters of sidelink channels, wherein the sidelink channels include at least one of:

a sidelink control channel, a sidelink data channel, a sidelink feedback channel and a sidelink broadcast channel.

Optionally, the sidelink control channel may include a PSCCH. The sidelink data channel may include a PSSCH. The sidelink feedback channel may include a PSFCH. The sidelink broadcast channel may include a PSBCH and a sidelink synchronization signal, wherein the sidelink synchronization signal includes a sidelink primary synchronization signal (S-PSS) and a sidelink secondary synchronization signal (S-SSS).

Optionally, transmission resources and transmission parameters of the sidelink data channel include at least one of:

time domain resource information of the sidelink data channel, frequency domain resource information of the sidelink data channel, demodulation reference signal (DMRS) information of the sidelink data channel, a transmission scheme of the sidelink data channel, the number of transmission layers of the sidelink data channel, a demodulation coding scheme (MCS) of the sidelink data channel, the number of retransmissions of the sidelink data channel, redundancy version information of the sidelink data channel, the number of hybrid automatic repeat request (HARQ) processes supported by the sidelink data channel, power control information of the sidelink data channel, the size of sidelink data capable of being transmitted on the sidelink data channel, a target address identifier of the sidelink data, priority information of the sidelink data and delay information of the sidelink data.

Optionally, the time domain resource information of the sidelink data channel includes at least one of:

period information of the sidelink data channel, information of a slot occupied by the sidelink data channel in each period, and information of a time domain symbol occupied by the sidelink data channel in a slot.

Optionally, the frequency domain resource information of the sidelink data channel includes at least one of:

a starting frequency domain position of the sidelink data channel and the size of frequency domain resources occupied by the sidelink data channel.

Optionally, the size of the frequency domain resources of the sidelink data channel may adopt a sub-channel as granularity.

Optionally, the demodulation reference signal (DMRS) information of the sidelink data channel includes at least one of:

a pattern of a DMRS of the sidelink data channel, scrambling information of the DMRS, and information of a time domain symbol occupied by the DMRS.

The information of a time domain symbol occupied by the DMRS is used for determining position and number information of time domain symbols occupied by the DMRS in the PSSCH.

Optionally, the number of retransmissions of the sidelink data channel is used to indicate the number of retransmissions of the sidelink data or to determine the maximum number of transmissions of the sidelink data.

Optionally, the power control information of the sidelink data channel may indicate the maximum transmit power of the sidelink data channel. For example, the transmit power of the sidelink data channel cannot exceed the maximum transmit power.

Optionally, the power control information of the sidelink data channel may also include a QoS parameter, which may be priority information or reliability information.

Optionally, the target address identifier of the sidelink data may be an identifier of a terminal device, which can be used to indicate that only the sidelink data sent to the terminal device corresponding to the identifier can use the sidelink configured grant; or the target address index may also be a group identifier, which can be used to indicate that only the sidelink data sent to the terminal device in a group corresponding to the group identifier can use the sidelink configured grant; or the target address index is a service type identifier, which can be used to indicate that the sidelink configured grant can be used only when sending the sidelink data corresponding to the service type identifier.

Optionally, the size of the sidelink data capable of being transmitted on the sidelink data channel is the size of a transport block corresponding to the sidelink data.

Optionally, transmission resources and transmission parameters of the sidelink control channel include at least one of:

time domain resource information of the sidelink control channel and frequency domain resource information of the sidelink control channel.

Optionally, the time domain resource information of the sidelink control channel includes at least one of:

period information of the sidelink control channel, information of a slot occupied by the sidelink control channel in each period, and information of a time domain symbol occupied by the sidelink control channel in a slot.

Optionally, the frequency domain resource information of the sidelink control channel includes at least one of:

a starting frequency domain position of the sidelink control channel and the size of frequency domain resources occupied by the sidelink control channel.

Optionally, transmission resources and transmission parameters of the sidelink feedback channel include at least one of:

time domain resource information of the sidelink feedback channel, frequency domain resource information of the sidelink feedback channel, a format of the sidelink feedback channel, whether sidelink feedback is supported, a feedback mode of sidelink feedback information, feedback granularity information of the sidelink feedback information, and a first threshold, wherein the first threshold is a distance threshold between a receiving terminal and a transmitting terminal or a sidelink reference signal received power (RSRP) threshold.

Optionally, the time domain resource information of the sidelink feedback channel includes at least one of:

a time offset of the sidelink feedback channel relative to the sidelink data channel, period information of the sidelink feedback channel, and information of a time domain symbol occupied by the sidelink feedback channel in a slot.

Optionally, the frequency domain resource information of the sidelink feedback channel includes at least one of:

a starting frequency domain position of the sidelink feedback channel and the size of frequency domain resources occupied by the sidelink feedback channel.

Optionally, the format of the sidelink feedback channel includes at least one of:

a short feedback channel and a long feedback channel.

Optionally, the short feedback channel indicates that the sidelink feedback channel occupies part of time domain symbols used for sidelink transmission in one slot, and the long feedback channel indicates that the sidelink feedback channel occupies all of time domain symbols for sidelink transmission in one slot.

Optionally, the feedback granularity information of the sidelink feedback information is used to indicate that feedback is performed based on a code block group (CBG) or based on a transport block.

Optionally, the feedback mode of the sidelink feedback information includes at least one of:

feeding back only Negative ACKnowledgement (NACK), and feeding back ACKnowledgement (ACK)/NACK.

Optionally, transmission resources and transmission parameters of the sidelink broadcast channel include at least one of:

time domain resource information of the sidelink broadcast channel, frequency domain resource information of the sidelink broadcast channel, and synchronization source information of the sidelink broadcast channel.

Optionally, the time domain resource information of the sidelink broadcast channel includes at least one of:

period information of the sidelink broadcast channel, the number of transmission resources of the sidelink broadcast channel in each period, and information of a slot occupied by the sidelink broadcast channel in each period.

The number of transmission resources of the sidelink broadcast channel in each period is used to determine how many transmission resources are used for transmitting a sidelink broadcast channel in one period of the sidelink broadcast channel.

Optionally, the frequency domain resource information of the sidelink broadcast channel includes at least one of:

a starting frequency domain position of the sidelink broadcast channel, the size of frequency domain resources of the sidelink broadcast channel, a starting frequency domain position of the sidelink synchronization signal, and the size of frequency domain resources of the sidelink synchronization signal.

Optionally, the synchronization source information of the sidelink broadcast channel includes a synchronization source type, wherein the synchronization source type includes at least one of: global navigation satellite system, gNB, eNB, NR UE and LTE UE.

Optionally, the sidelink configured grant further includes transmission resources and transmission parameters of a sidelink reference signal.

Optionally, the transmission resources and transmission parameters of the sidelink reference signal include at least one of: whether the sidelink reference signal is included in the sidelink data channel, time domain resource information of the sidelink reference signal, and frequency domain resource information of the sidelink reference signal.

Optionally, the time domain resource information of the sidelink reference signal includes information of a time domain symbol occupied by the sidelink reference signal.

Optionally, the frequency domain resources of the sidelink reference signal include at least one of:

a frequency domain offset of the sidelink reference signal, the size of frequency domain resources occupied by the sidelink reference signal, and a frequency domain density of the sidelink reference signal.

Optionally, the frequency domain offset of the sidelink reference signal is an offset of a first subcarrier used for transmitting the sidelink reference signal in a resource block (RB) relative to subcarrier 0.

Optionally, the sidelink reference signal includes at least one of:

a sidelink channel state information reference signal (CSI-RS) and a sidelink phase tracking reference signal (PT-RS).

Optionally, the sidelink configured grant further includes at least one of:

channel state information feedback indication information, which is used for indicating whether the receiving terminal needs to send channel state information to the transmitting terminal;

channel measurement indication information, which is used for indicating whether the receiving terminal needs to perform channel measurement;

channel measurement feedback indication information, which is used for indicating whether the receiving terminal needs to feed back a channel measurement result to the transmitting terminal; and transmission resource information, which is used for determining transmission resources used by the receiving terminal to send the channel state information or the channel measurement result to the transmitting terminal.

Optionally, the sidelink configured grant further includes sidelink configured grant reception acknowledgement information, which is used for indicating whether the receiving terminal sends information indicating that the sidelink configuration grant is received correctly to the network device.

Optionally, the sidelink configured grant further includes uplink resource indication information used for indicating uplink resources which are allocated by the network device for the terminal device and are used for transmitting the sidelink configured grant reception acknowledgement information. The sidelink configured grant reception acknowledgement information is used for indicating whether the receiving terminal sends information indicating that the sidelink configured grant is received correctly to the network device.

Optionally, the method further includes the network device sending a plurality of pieces of configuration information to the terminal device, the plurality of pieces of configuration information being used for configuring a plurality of sidelink configured grants for sidelink data transmission, wherein the plurality of pieces of configuration information includes the first configuration information and/or the second configuration information.

Optionally, the network device activates or deactivates at least one of the plurality of sidelink configured grants through RRC signaling or downlink control information (DCI).

Optionally, the DCI includes a first bitmap, and each bit in the first bit map is used to indicate to activate or deactivate a sidelink configured grant in the plurality of sidelink configured grants which is corresponding to the bit.

Optionally, the DCI includes a first index for indicating a first sidelink configured grant, and the DCI or a physical downlink control channel (PDCCH) corresponding to the DCI includes second indication information for indicating to activate or deactivate the first sidelink configured grant.

Optionally, when the second indication information takes a first value, it is used to indicate to activate the first sidelink configured grant, and when the second indication information takes a second value, it is used to indicate to deactivate the first sidelink configured grant.

Optionally, the second indication information is carried in an information field in the DCI.

Optionally, the second indication information is carried in a first information field in the DCI, and the first information field takes a specific value, indicating that the second indication information is used to indicate to activate the first sidelink configured grant, and the first information field takes other values than the specific value, indicating that the second indication information is used to indicate to deactivate the first sidelink configured grant.

Optionally, the specific value is an invalid state of the first information field.

Optionally, the second indication information is a scrambling sequence for scrambling the DCI.

Optionally, the DCI includes a second index and a third index, the second index corresponding to an index of an activated sidelink configured grant, and the third index corresponding to an index of a deactivated sidelink configured grant.

Optionally, the second index is the first index in the DCI, and the third index is the second index in the DCI.

Optionally, in some implementations, the method further includes:
the network device receiving the first data sent by the terminal device on transmission resources of an uplink configured grant, the first data being used for requesting the network device to allocate the sidelink configured grant for the terminal device.

Optionally, the first data includes at least one of:
first indication information, which is used for indicating that the first data is used to request for the sidelink configured grant;
a target address index, which is used for determining a receiving device of the sidelink data;
a logical channel group identifier, which is used for indicating a logical channel group corresponding to the sidelink data; and
a buffer size, which is used for indicating the total amount of sidelink data to be transmitted on the logical channel group.

Optionally, the first data also includes transmission parameters of the sidelink data to be transmitted.

Optionally, the transmission parameters of the sidelink data to be transmitted include at least one of: priority information, period information, delay information, reliability information, transmission rate information, a time deviation and a data type identifier.

Optionally, the priority information is the highest priority of a plurality of priorities of the sidelink data to be transmitted.

Optionally, the time deviation is used to indicate a time deviation of an expected arrival time of the sidelink data relative to a specific time boundary.

Optionally, the specific time boundary is a subframe with a subframe number of zero in a system frame with a system frame number of zero.

Optionally, the expected arrival time of the sidelink data is a time at which the sidelink data is expected to arrive at a logical channel.

Optionally, the data type identifier is used to determine whether the data to be transmitted is uplink data or sidelink data.

Optionally, the first indication information is carried by one of the following ways:
a radio network temporary identity (RNTI) carried in the first data;
a scrambling sequence used for scrambling the first data; and
a specific information field of a media access control (MAC) control element (CE) of the first data.

Optionally, the target address index is used to determine one of: a group identifier, a terminal identifier and a service type identifier.

Method implementations of the present disclosure have been described in detail above in conjunction with FIGS. 2 to 7, and device implementations of the present disclosure will be described in detail below in conjunction with FIGS. 8 to 13. It should be understood that the device implementations correspond to the method implementations, and may be described similarly with reference to the method implementations.

FIG. 8 is a schematic block diagram of a terminal device in accordance with an implementation of the present disclosure. The terminal device 500 in FIG. 8 includes a communication module 510 configured to, in a case that there is sidelink data to be transmitted, send first data to a network device on transmission resources of an uplink configured grant, the first data being used for requesting the network device to allocate sidelink transmission resources for the terminal device.

Optionally, the first data being used to request the network device to allocate the sidelink transmission resources for the terminal device includes: the first data being used to request the network device to allocate a sidelink configured grant for the terminal device, the sidelink configured grant including transmission resources and/or transmission parameters for sidelink transmission.

Optionally, the first data includes at least one of:
first indication information, which is used for indicating that the first data is used to request for the sidelink transmission resources;
a target address index, which is used for determining a receiving device of the sidelink data;

a logical channel group identifier, which is used for indicating a logical channel group corresponding to the sidelink data; and a buffer size, which is used for indicating the total amount of sidelink data to be transmitted on the logical channel group.

Optionally, the first data also includes transmission parameters of the sidelink data to be transmitted.

Optionally, the transmission parameters of the sidelink data to be transmitted include at least one of:

priority information, period information, delay information, reliability information, transmission rate information, a time deviation and a data type identifier.

Optionally, the priority information is the highest priority of a plurality of priorities of the sidelink data to be transmitted.

Optionally, the time deviation is used to indicate a time deviation of an expected arrival time of the sidelink data relative to a specific time boundary.

Optionally, the specific time boundary is a subframe with a subframe number of zero in a system frame with a system frame number of zero.

Optionally, the expected arrival time of the sidelink data is a time at which the sidelink data is expected to arrive at a logical channel.

Optionally, the data type identifier is used to determine whether the data to be transmitted is uplink data or sidelink data.

Optionally, the first indication information is carried by one of the following ways:

a radio network temporary identity (RNTI) carried in the first data;

a scrambling sequence used for scrambling the first data; and a specific information field of a media access control (MAC) control element (CE) of the first data.

Optionally, the target address index is used to determine one of: a group identifier, a terminal identifier and a service type identifier.

Optionally, the communication module is further configured to send second data to the network device, the second data being used to request the network device to allocate the uplink configured grant for the terminal device.

Optionally, the second data includes at least one of: delay information, reliability information, transmission rate information, period information, size and a data type identifier of data to be transmitted.

Optionally, the data type identifier of the data to be transmitted is used to determine whether the data to be transmitted is uplink data or sidelink data.

Optionally, the communication module is further configured to receive first configuration information and/or second configuration information sent by the network device, the first configuration information and/or the second configuration information being used to configure the sidelink configured grant.

Optionally, the sidelink configured grant includes transmission resources and/or transmission parameters of sidelink channels, wherein the sidelink channels include at least one of: a sidelink control channel, a sidelink data channel, a sidelink feedback channel and a sidelink broadcast channel.

Optionally, transmission resources and transmission parameters of the sidelink data channel include at least one of:

time domain resource information of the sidelink data channel, frequency domain resource information of the sidelink data channel, demodulation reference signal (DMRS) information of the sidelink data channel, a transmission scheme of the sidelink data channel, the number of transmission layers of the sidelink data channel, a demodulation coding scheme (MCS) of the sidelink data channel, the number of retransmissions of the sidelink data channel, redundancy version information of the sidelink data channel, the number of hybrid automatic repeat request (HARQ) processes supported by the sidelink data channel, power control information of the sidelink data channel, size of sidelink data capable of being transmitted on the sidelink data channel, a target address identifier of the sidelink data, priority information of the sidelink data and delay information of the sidelink data.

Optionally, the time domain resource information of the sidelink data channel includes at least one of:

period information of the sidelink data channel, information of a slot occupied by the sidelink data channel in each period, and information of a time domain symbol occupied by the sidelink data channel in a slot.

Optionally, the frequency domain resource information of the sidelink data channel includes at least one of:

a starting frequency domain position of the sidelink data channel and the size of frequency domain resources occupied by the sidelink data channel.

Optionally, the demodulation reference signal (DMRS) information of the sidelink data channel includes at least one of:

a pattern of a DMRS of the sidelink data channel, scrambling information of the DMRS, and information of a time domain symbol occupied by the DMRS.

Optionally, the size of the sidelink data capable of being transmitted on the sidelink data channel is a size of a transport block corresponding to the sidelink data.

Optionally, transmission resources and transmission parameters of the sidelink control channel include at least one of:

time domain resource information of the sidelink control channel and frequency domain resource information of the sidelink control channel.

Optionally, the time domain resource information of the sidelink control channel includes at least one of:

period information of the sidelink control channel, information of a slot occupied by the sidelink control channel in each period, and information of a time domain symbol occupied by the sidelink control channel in a slot.

Optionally, the frequency domain resource information of the sidelink control channel includes at least one of:

a starting frequency domain position of the sidelink control channel, and the size of frequency domain resources occupied by the sidelink control channel.

Optionally, transmission resources and transmission parameters of the sidelink feedback channel include at least one of:

time domain resource information of the sidelink feedback channel, frequency domain resource information of the sidelink feedback channel, a format of the sidelink feedback channel, whether sidelink feedback is supported, a feedback mode of sidelink feedback information, feedback granularity information of the sidelink feedback information, and a first threshold, wherein the first threshold is a distance threshold between a receiving terminal and a transmitting terminal or a sidelink reference signal received power (RSRP) threshold.

Optionally, the time domain resource information of the sidelink feedback channel includes at least one of:

a time offset of the sidelink feedback channel relative to the sidelink data channel, period information of the sidelink feedback channel, and information of a time domain symbol occupied by the sidelink feedback channel in a slot.

Optionally, the frequency domain resource information of the sidelink feedback channel includes at least one of:
a starting frequency domain position of the sidelink feedback channel, and the size of frequency domain resources occupied by the sidelink feedback channel.

Optionally, the format of the sidelink feedback channel includes at least one of:
a short feedback channel and a long feedback channel.

Optionally, the short feedback channel indicates that the sidelink feedback channel occupies part of time domain symbols used for sidelink transmission in one slot, and the long feedback channel indicates that the sidelink feedback channel occupies all of time domain symbols for sidelink transmission in one slot.

Optionally, the feedback granularity information of the sidelink feedback information is used to indicate that feedback is performed based on a code block group (CBG) or based on a transport block.

Optionally, the feedback mode of the sidelink feedback information includes at least one of:
feeding back only Negative ACKnowledgement (NACK), and feeding back ACKnowledgement (ACK)/NACK.

Optionally, if the feedback mode of the sidelink feedback information is feeding back only NACK, the communication module is further configured to: if the first threshold is met and a detection result of the sidelink data is NACK, feed back NACK; or if the first threshold is met and the detection result of the sidelink data is ACK, not send sidelink feedback information; or if the first threshold is not met, not send the sidelink feedback information.

Optionally, transmission resources and transmission parameters of the sidelink broadcast channel include at least one of:
time domain resource information of the sidelink broadcast channel, frequency domain resource information of the sidelink broadcast channel and synchronization source information of the sidelink broadcast channel.

Optionally, the time domain resource information of the sidelink broadcast channel includes at least one of:
period information of the sidelink broadcast channel, the number of transmission resources of the sidelink broadcast channel in each period, and information of a slot occupied by the sidelink broadcast channel in each period.

Optionally, the frequency domain resource information of the sidelink broadcast channel includes at least one of:
a starting frequency domain position of the sidelink broadcast channel, the size of frequency domain resources of the sidelink broadcast channel, a starting frequency domain position of the sidelink synchronization signal, and the size of frequency domain resources of the sidelink synchronization signal.

Optionally, the synchronization source information of the sidelink broadcast channel includes a synchronization source type, wherein the synchronization source type includes at least one of: global navigation satellite system, gNB, eNB, NR UE and LTE UE.

Optionally, the sidelink configured grant further includes transmission resources and transmission parameters of a sidelink reference signal.

Optionally, the transmission resources and transmission parameters of the sidelink reference signal include at least one of:
whether the sidelink reference signal is included in the sidelink data channel, time domain resource information of the sidelink reference signal, and frequency domain resource information of the sidelink reference signal.

Optionally, the time domain resource information of the sidelink reference signal includes information of a time domain symbol occupied by the sidelink reference signal.

Optionally, the frequency domain resources of the sidelink reference signal include at least one of:
a frequency domain offset of the sidelink reference signal, the size of frequency domain resources occupied by the sidelink reference signal, and a frequency domain density of the sidelink reference signal.

Optionally, the frequency domain offset of the sidelink reference signal is an offset of a first subcarrier used for transmitting the sidelink reference signal in a resource block (RB) relative to subcarrier 0.

Optionally, the sidelink reference signal includes at least one of:
a sidelink channel state information reference signal (CSI-RS) and a sidelink phase tracking reference signal (PT-RS).

Optionally, the sidelink configured grant further includes at least one of:
channel state information feedback indication information, which is used for indicating whether the receiving terminal needs to send channel state information to the transmitting terminal;
channel measurement indication information, which is used for indicating whether the receiving terminal needs to perform channel measurement;
channel measurement feedback indication information, which is used for indicating whether the receiving terminal needs to feed back a channel measurement result to the transmitting terminal; and
transmission resource information, which is used for determining transmission resources used by the receiving terminal to send the channel state information or the channel measurement result to the transmitting terminal.

Optionally, the sidelink configured grant further includes sidelink configured grant reception acknowledgement information, which is used for indicating whether the receiving terminal sends information indicating that the sidelink configuration grant is received correctly to the network device.

Optionally, the sidelink configured grant further includes uplink resource indication information used for indicating uplink resources which are allocated by the network device for the terminal device and used for transmitting the sidelink configured grant reception acknowledgement information. The sidelink configured grant reception acknowledgement information is used for indicating whether the receiving terminal sends information indicating that the sidelink configured grant is received correctly to the network device.

Optionally, the communication module is further configured to receive a plurality of pieces of configuration information sent by the network device, the plurality of pieces of configuration information being used to configure a plurality of sidelink configured grants for sidelink data transmission, wherein the plurality of pieces of configuration information includes the first configuration information and/or the second configuration information.

Optionally, the network device activates or deactivates at least one of the plurality of sidelink configured grants through RRC signaling or downlink control information (DCI).

Optionally, the DCI includes a first bitmap, and each bit in the first bit map is used to indicate to activate or deactivate a sidelink configured grant in the plurality of sidelink configured grants which is corresponding to the bit.

Optionally, the DCI includes a first index for indicating a first sidelink configured grant, and the DCI or a physical downlink control channel (PDCCH) corresponding to the DCI includes second indication information for indicating to activate or deactivate the first sidelink configured grant.

Optionally, when the second indication information takes a first value, the second indication information is used to indicate to activate the first sidelink configured grant, and when the second indication information takes a second value, the second indication information is used to indicate to deactivate the first sidelink configured grant.

Optionally, the second indication information is carried in an information field in the DCI.

Optionally, the second indication information is carried in a first information field in the DCI, and the first information field takes a specific value, indicating that the second indication information is used to indicate to activate the first sidelink configured grant, and the first information field takes other values than the specific value, indicating that the second indication information is used to indicate to deactivate the first sidelink configured grant.

Optionally, the specific value is an invalid state of the first information field.

Optionally, the second indication information is a scrambling sequence for scrambling the DCI.

Optionally, the DCI includes a second index and a third index, the second index corresponding to an index of the activated sidelink configured grant, and the third index corresponding to an index of the deactivated sidelink configured grant.

Optionally, the second index is the first index in the DCI, and the third index is the second index in the DCI.

It should be understood that the terminal device 500 in accordance with an implementation of the present disclosure may correspond to the terminal device in the method implementation of the present disclosure, and the above-mentioned and other operations and/or functions of various units in the terminal device 500 are respectively used for implementing the corresponding processes of the terminal device in the method 200 shown in FIG. 3, and will not be repeated herein for brevity.

FIG. 9 is a schematic block diagram of a terminal device in accordance with an implementation of the present disclosure. The terminal device 600 of FIG. 9 includes a communication module 610 configured to send second data to a network device, the second data being used for requesting the network device to allocate an uplink configured grant for the terminal device, and the uplink configured grant including transmission resources and/or transmission parameters for uplink transmission.

Optionally, the second data includes at least one of: delay information, reliability information, transmission rate information, period information, data size and a data type identifier, of data to be transmitted.

Optionally, the data type identifier of the data to be transmitted is used to determine whether the data to be transmitted is uplink data or sidelink data.

Optionally, the communication module is further configured to: in a case that there is sidelink data to be transmitted, send first data to the network device on transmission resources of the uplink configured grant, the first data being used to request the network device to allocate sidelink transmission resources for the terminal device.

Optionally, the first data being used to request the network device to allocate the sidelink transmission resources for the terminal device includes: the first data being used to request the network device to allocate a sidelink configured grant for the terminal device, the sidelink configured grant including transmission resources and/or transmission parameters for sidelink transmission.

Optionally, the first data includes at least one of:
first indication information, which is used for indicating that the first data is used to request for the sidelink configured grant;
a target address index, which is used for determining a receiving device of the sidelink data;
a logical channel group identifier, which is used for indicating a logical channel group corresponding to the sidelink data; and
a buffer size, which is used for indicating the total amount of sidelink data to be transmitted on the logical channel group.

Optionally, the first data also includes transmission parameters of the sidelink data to be transmitted.

Optionally, the transmission parameters of the sidelink data to be transmitted include at least one of:
priority information, period information, delay information, reliability information, transmission rate information, a time deviation and a data type identifier.

Optionally, the priority information is the highest priority of a plurality of priorities of the sidelink data to be transmitted.

Optionally, the time deviation is used to indicate a time deviation of an expected arrival time of the sidelink data relative to a specific time boundary.

Optionally, the specific time boundary is a subframe with a subframe number of zero in a system frame with a system frame number of zero.

Optionally, the expected arrival time of the sidelink data is a time at which the sidelink data is expected to arrive at a logical channel.

Optionally, the data type identifier is used to determine whether the data to be transmitted is uplink data or sidelink data.

Optionally, the first indication information is carried by one of the following ways:
a radio network temporary identity (RNTI) carried in the first data;
a scrambling sequence used for scrambling the first data; and
a specific information field of a media access control (MAC) control element (CE) of the first data.

It should be understood that the terminal device 600 in accordance with an implementation of the present disclosure may correspond to the terminal device in the method implementation of the present disclosure, and the above-mentioned and other operations and/or functions of various units in the terminal device 600 are respectively used for implementing the corresponding processes of the terminal device in the method 300 shown in FIG. 6, and will not be repeated herein for brevity.

FIG. 10 is a schematic block diagram of a network device in accordance with an implementation of the present disclosure. The network device 700 of FIG. 10 includes a communication module 710 configured to send first configuration information and/or second configuration information to a terminal device, the first configuration information and/or second configuration information being used for configuring a sidelink configured grant, and the sidelink configured grant including transmission resources and/or transmission parameters for sidelink transmission.

Optionally, the sidelink configured grant includes at least one of: transmission resources and/or transmission parameters of sidelink channels, wherein the sidelink channels include at least one of: a sidelink control channel, a sidelink data channel, a sidelink feedback channel and a sidelink broadcast channel.

Optionally, transmission resources and transmission parameters of the sidelink data channel include at least one of: time domain resource information of the sidelink data channel, frequency domain resource information of the sidelink data channel, demodulation reference signal (DMRS) information of the sidelink data channel, a transmission scheme of the sidelink data channel, the number of transmission layers of the sidelink data channel, a demodulation coding scheme (MCS) of the sidelink data channel, the number of retransmissions of the sidelink data channel, redundancy version information of the sidelink data channel, the number of hybrid automatic repeat request (HARQ) processes supported by the sidelink data channel, power control information of the sidelink data channel, the size of sidelink data capable of being transmitted on the sidelink data channel, a target address identifier of the sidelink data, priority information of the sidelink data and delay information of the sidelink data.

Optionally, the time domain resource information of the sidelink data channel includes at least one of:
  period information of the sidelink data channel, information of a slot occupied by the sidelink data channel in each period, and information of a time domain symbol occupied by the sidelink data channel in a slot.

Optionally, the frequency domain resource information of the sidelink data channel includes at least one of:
  a starting frequency domain position of the sidelink data channel and the size of frequency domain resources occupied by the sidelink data channel.

Optionally, the demodulation reference signal (DMRS) information of the sidelink data channel includes at least one of:
  a pattern of a DMRS of the sidelink data channel, scrambling information of the DMRS, and information of a time domain symbol occupied by the DMRS.

Optionally, the size of the sidelink data capable of being transmitted on the sidelink data channel is the size of a transport block corresponding to the sidelink data.

Optionally, transmission resources and transmission parameters of the sidelink control channel include at least one of:
  time domain resource information of the sidelink control channel and frequency domain resource information of the sidelink control channel.

Optionally, the time domain resource information of the sidelink control channel includes at least one of:
  period information of the sidelink control channel, information of a slot occupied by the sidelink control channel in each period, and information of a time domain symbol occupied by the sidelink control channel in a slot.

Optionally, the frequency domain resource information of the sidelink control channel includes at least one of:
  a starting frequency domain position of the sidelink control channel and the size of frequency domain resources occupied by the sidelink control channel.

Optionally, transmission resources and transmission parameters of the sidelink feedback channel include at least one of:
  time domain resource information of the sidelink feedback channel, frequency domain resource information of the sidelink feedback channel, a format of the sidelink feedback channel, whether sidelink feedback is supported, a feedback mode of sidelink feedback information, feedback granularity information of the sidelink feedback information, and a first threshold, wherein the first threshold is a distance threshold between a receiving terminal and a transmitting terminal or a sidelink reference signal received power (RSRP) threshold.

Optionally, the time domain resource information of the sidelink feedback channel includes at least one of:
  a time offset of the sidelink feedback channel relative to the sidelink data channel, period information of the sidelink feedback channel, and information of a time domain symbol occupied by the sidelink feedback channel in a slot.

Optionally, the frequency domain resource information of the sidelink feedback channel includes at least one of:
  a starting frequency domain position of the sidelink feedback channel and the size of frequency domain resources occupied by the sidelink feedback channel.

Optionally, the format of the sidelink feedback channel includes at least one of: a short feedback channel and a long feedback channel.

Optionally, the short feedback channel indicates that the sidelink feedback channel occupies part of time domain symbols used for sidelink transmission in one slot, and the long feedback channel indicates that the sidelink feedback channel occupies all of time domain symbols for sidelink transmission in one slot.

Optionally, the feedback granularity information of the sidelink feedback information is used to indicate that feedback is performed based on a code block group (CBG) or based on a transport block.

Optionally, the feedback mode of the sidelink feedback information includes at least one of:
  feeding back only Negative ACKnowledgement (NACK), and feeding back ACKnowledgement (ACK)/NACK.

Optionally, transmission resources and transmission parameters of the sidelink broadcast channel include at least one of:
  time domain resource information of the sidelink broadcast channel, frequency domain resource information of the sidelink broadcast channel, and synchronization source information of the sidelink broadcast channel.

Optionally, the time domain resource information of the sidelink broadcast channel includes at least one of:
  period information of the sidelink broadcast channel, the number of transmission resources of the sidelink broadcast channel in each period, and information of a slot occupied by the sidelink broadcast channel in each period.

Optionally, the frequency domain resource information of the sidelink broadcast channel includes at least one of:
  a starting frequency domain position of the sidelink broadcast channel, the size of frequency domain resources of the sidelink broadcast channel, a starting frequency domain position of the sidelink synchronization signal, and the size of frequency domain resources of the sidelink synchronization signal.

Optionally, the synchronization source information of the sidelink broadcast channel includes a synchronization source type, wherein the synchronization source type includes at least one of: global navigation satellite system, gNB, eNB, NR UE and LTE UE.

Optionally, the sidelink configured grant further includes transmission resources and transmission parameters of a sidelink reference signal.

Optionally, the transmission resources and transmission parameters of the sidelink reference signal include at least one of:

whether the sidelink reference signal is included in the sidelink data channel, time domain resource information of the sidelink reference signal, and frequency domain resource information of the sidelink reference signal.

Optionally, the time domain resource information of the sidelink reference signal includes information of a time domain symbol occupied by the sidelink reference signal.

Optionally, the frequency domain resources of the sidelink reference signal include at least one of:

a frequency domain offset of the sidelink reference signal, the size of frequency domain resources occupied by the sidelink reference signal, and a frequency domain density of the sidelink reference signal.

Optionally, the frequency domain offset of the sidelink reference signal is an offset of a first subcarrier used for transmitting the sidelink reference signal in a resource block (RB) relative to subcarrier 0.

Optionally, the sidelink reference signal includes at least one of:

a sidelink channel state information reference signal (CSI-RS) and a sidelink phase tracking reference signal (PT-RS).

Optionally, the sidelink configured grant further includes at least one of:

channel state information feedback indication information, which is used for indicating whether the receiving terminal needs to send channel state information to the transmitting terminal;

channel measurement indication information, which is used for indicating whether the receiving terminal needs to perform channel measurement;

channel measurement feedback indication information, which is used for indicating whether the receiving terminal needs to feed back a channel measurement result to the transmitting terminal; and transmission resource information, which is used for determining transmission resources used by the receiving terminal to send the channel state information or the channel measurement result to the transmitting terminal.

Optionally, the sidelink configured grant further includes sidelink configured grant reception acknowledgement information, which is used for indicating whether the receiving terminal sends information indicating that the sidelink configuration grant is received correctly to the network device.

Optionally, the sidelink configured grant further includes uplink resource indication information used for indicating uplink resources which are allocated by the network device for the terminal device and used for transmitting the sidelink configured grant reception acknowledgement information. The sidelink configured grant reception acknowledgement information is used for indicating whether the receiving terminal sends information indicating that the sidelink configured grant is received correctly to the network device.

Optionally, the communication module is further configured to: send a plurality of pieces of configuration information to the terminal device, the plurality of pieces of configuration information being used for configuring a plurality of sidelink configured grants for sidelink data transmission, wherein the plurality of pieces of configuration information include the first configuration information and/or the second configuration information.

Optionally, the network device activates or deactivates at least one of the plurality of sidelink configured grants through RRC signaling or downlink control information (DCI).

Optionally, the DCI includes a first bitmap, and each bit in the first bit map is used to indicate to activate or deactivate a sidelink configured grant in the plurality of sidelink configured grants which is corresponding to the bit.

Optionally, the DCI includes a first index for indicating a first sidelink configured grant, and the DCI or a physical downlink control channel (PDCCH) corresponding to the DCI includes second indication information for indicating to activate or deactivate the first sidelink configured grant.

Optionally, when the second indication information takes a first value, it is used to indicate to activate the first sidelink configured grant, and when the second indication information takes a second value, it is used to indicate to deactivate the first sidelink configured grant.

Optionally, the second indication information is carried in an information field in the DCI. Optionally, the second indication information is carried in a first information field in the DCI, and the first information field takes a specific value, indicating that the second indication information is used to indicate to activate the first sidelink configured grant, and the first information field takes other values than the specific value, indicating that the second indication information is used to indicate to deactivate the first sidelink configured grant.

Optionally, the specific value is an invalid state of the first information field.

Optionally, the second indication information is a scrambling sequence for scrambling the DCI.

Optionally, the DCI includes a second index and a third index, the second index corresponding to an index of the activated sidelink configured grant, and the third index corresponding to an index of the deactivated sidelink configured grant.

Optionally, the second index is the first index in the DCI, and the third index is the second index in the DCI.

Optionally, the communication module is further configured to receive the first data sent by the terminal device on transmission resources of an uplink configured grant, the first data being used for requesting the network device to allocate the sidelink configured grant for the terminal device.

Optionally, the first data includes at least one of:

first indication information, which is used for indicating that the first data is used to request for the sidelink configured grant;

a target address index, which is used for determining a receiving device of the sidelink data;

a logical channel group identifier, which is used for indicating a logical channel group corresponding to the sidelink data; and a buffer size, which is used for indicating the total amount of sidelink data to be transmitted on the logical channel group.

Optionally, the first data also includes transmission parameters of the sidelink data to be transmitted.

Optionally, the transmission parameters of the sidelink data to be transmitted include at least one of: priority information, period information, delay information, reliability information, transmission rate information, a time deviation and a data type identifier.

Optionally, the priority information is the highest priority of a plurality of priorities of the sidelink data to be transmitted.

Optionally, the time deviation is used to indicate a time deviation of an expected arrival time of the sidelink data relative to a specific time boundary.

Optionally, the specific time boundary is a subframe with a subframe number of zero in a system frame with a system frame number of zero.

Optionally, the expected arrival time of the sidelink data is a time at which the sidelink data is expected to arrive at a logical channel.

Optionally, the data type identifier is used to determine whether the data to be transmitted is uplink data or sidelink data.

Optionally, the first indication information is carried by one of the following ways:
- a radio network temporary identity (RNTI) carried in the first data;
- a scrambling sequence used for scrambling the first data; and
- a specific information field of a media access control (MAC) control element (CE) of the first data.

Optionally, the target address index is used to determine one of: a group identifier, a terminal identifier and a service type identifier.

It should be understood that the network device 700 in accordance with an implementation of the present disclosure may correspond to the network device in the method implementations of the present disclosure, and the above-mentioned and other operations and/or functions of various units in the network device 700 are respectively used for implementing the corresponding processes of the network device in the method 400 shown in FIG. 7, and will not be repeated herein for brevity.

Figure 11:
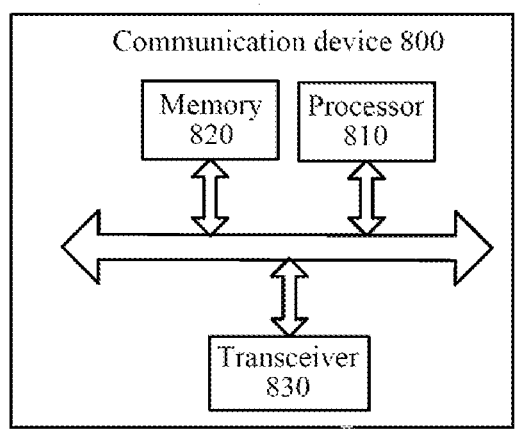
FIG. 11 is a schematic block diagram of a communication system in accordance with an implementation of the present disclosure.

FIG. 11 is a schematic structural diagram of a communication device 800 in accordance with an implementation of the present disclosure. The communication device 800 shown in FIG. 11 includes a processor 810, which may invoke and run a computer program from a memory to implement the methods in the implementations of the present disclosure.

Optionally, as shown in FIG. 11, the communication device 800 may further include the memory 820. The processor 810 may invoke and run a computer program from the memory 820 to implement the methods in the implementations of the present disclosure.

The memory 820 may be a separate device independent of the processor 810 or may be integrated in the processor 810.

Optionally, as shown in FIG. 11, the communication device 800 may further include a transceiver 830. The processor 810 may control the transceiver 830 to communicate with other devices. Specifically, the transceiver 830 may send information or data to other devices or receive information or data sent by other devices.

The transceiver 830 may include a transmitter and a receiver. The transceiver 830 may further include antennas, the number of which may be one or more.

Optionally, the communication device 800 may be specifically the network device in accordance with an implementation of the present disclosure, and the communication device 800 may implement the corresponding processes implemented by the network device in various methods in the implementations of the present disclosure, which will not be described repeatedly herein for brevity.

Optionally, the communication device 800 may be specifically the mobile terminal/terminal device in accordance with an implementation of the present disclosure, and the communication device 800 may implement the corresponding processes implemented by the mobile terminal/terminal device in various methods in the implementations of the present disclosure, which will not be described repeatedly herein for brevity.

Figure 12:
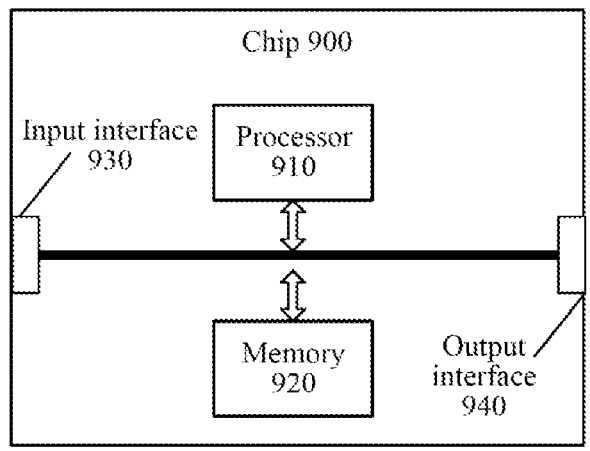
FIG. 12 is a schematic block diagram of a chip in accordance with an implementation of the present disclosure.

FIG. 12 is a schematic structural diagram of a chip in accordance with an implementation of the present disclosure. The chip 900 shown in FIG. 12 includes a processor 910, which may invoke and run a computer program from a memory to implement the methods in the implementations of the present disclosure.

Optionally, as shown in FIG. 12, the chip 900 may further include the memory 920. The processor 910 may invoke and run the computer program from the memory 920 to implement the methods in the implementations of the present disclosure.

The memory 920 may be a separate device independent of the processor 910 or may be integrated in the processor 910.

Optionally, the chip 900 may further include an input interface 930. The processor 910 may control the input interface 930 to communicate with other devices or chips. Specifically, the processor 910 may acquire information or data sent by other devices or chips. Optionally, the chip 900 may further include an output interface 940. The processor 910 may control the output interface 940 to communicate with other devices or chips. Specifically, the processor 910 may output information or data to other devices or chips.

Optionally, the chip may be applied to the network device in the implementations of the present disclosure, and the chip may implement the corresponding processes implemented by the network device in various methods in the implementations of the present disclosure, which will not be described repeatedly herein for brevity.

Optionally, the chip may be applied to the mobile terminal/terminal device in the implementations of the present disclosure, and the chip may implement the corresponding processes implemented by the mobile terminal/terminal device in various methods in the implementations of the present disclosure, which will not be described repeatedly herein for brevity.

Optionally, the chip mentioned in the implementations of the present disclosure may be referred as a system-level chip, a system chip, a chip system or a system-on-chip, etc.

Figure 13:
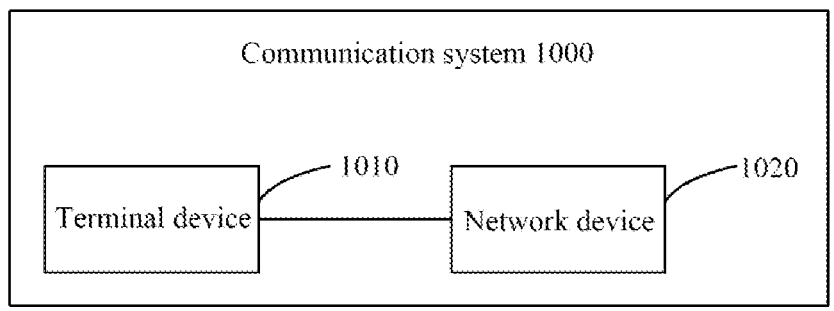
FIG. 13 is a schematic block diagram of a communication system in accordance with an implementation of the present disclosure.

FIG. 13 is a schematic block diagram of a communication system 1000 in accordance with an implementation of the present disclosure. As shown in FIG. 13, the communication system 1000 may include a terminal device 1010 and a network device 1020.

The terminal device 1010 may implement the corresponding functions implemented by the terminal device in the methods described above, and the network device 1020 may implement the corresponding functions implemented by the network device in the methods described above, which will not be described repeatedly herein for brevity.

It should be understood that the processor in the implementations of the present disclosure may be an integrated circuit chip having a signal processing capability. In an implementation process, each of the steps of the foregoing method implementations may be implemented through an integrated logic circuit of hardware in the processor or instructions in the form of software. The processor described above may be a general purpose processor, a digital signal processor (DSP), an application specific integrated circuit (ASIC), a field programmable gate array (FPGA) or other programmable logic devices, a discrete gate or a transistor logic device, or a discrete hardware component. The processor may implement or perform various methods, steps and logical block diagrams disclosed in the implementations of the present disclosure. The general purpose processor may be a microprocessor, or the processor may also be any conventional processor, or the like. The steps of the methods disclosed in the implementations of the present disclosure may be directly embodied to be performed by a hardware decoding processor, or may be performed by a combination of hardware and software modules in the decoding processor. The software modules may be located in a traditional storage medium in the art, such as a random access memory, a flash memory, a read-only memory, a programmable read-only memory, an electrically erasable programmable memory, a register, etc. The storage medium is located in the memory, and the processor reads information in the memory and completes the steps of the foregoing methods in combination with its hardware.

It may be understood that the memory in the implementations of the present disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. Through exemplary but non-restrictive description, many forms of RAMs may be available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct Rambus dynamic random access memory (DR RAM). It should be noted that the memory in the systems and methods described herein is intended to include, but not be limited to, these and any other suitable types of memories.

It should be understood that the foregoing memory is described in an exemplary but non-limiting sense. For example, the memory in the implementations of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a direct Rambus RAM (DR RAM), or the like. That is, the memory in the implementations of the present disclosure is intended to include, but not be limited to, these and any other suitable types of memories.

An implementation of the present disclosure further provides a computer readable storage medium configured to store a computer program.

Optionally, the computer readable storage medium may be applied to the network device in the implementations of the present disclosure, and the computer program causes a computer to perform the corresponding processes implemented by the network device in various methods in accordance with the implementations of the present disclosure, which will not be repeated herein for brevity.

Optionally, the computer readable storage medium may be applied to the mobile terminal/terminal device in the implementations of the present disclosure, and the computer program causes a computer to perform the corresponding processes implemented by the mobile terminal/terminal device in various methods in accordance with the implementations of the present disclosure, which will not be repeated herein for brevity.

An implementation of the present disclosure further provides a computer program product including computer program instructions.

Optionally, the computer program product may be applied to the network device in the implementations of the present disclosure, and the computer program instructions cause a computer to perform the corresponding processes implemented by the network device in various methods in accordance with the implementations of the present disclosure, which will not be repeated herein for brevity.

Optionally, the computer program product may be applied to the mobile terminal/terminal device in the implementations of the present disclosure, and the computer program instructions cause a computer to perform the corresponding processes implemented by the mobile terminal/terminal device in various methods in accordance with the implementations of the present disclosure, which will not be repeated herein for brevity.

An implementation of the present disclosure further provides a computer program. Optionally, the computer program may be applied to the network device in the implementations of the present disclosure. The computer program, when running on a computer, causes the computer to perform the corresponding processes implemented by the network device in various methods in accordance with the implementations of the present disclosure, which will not be repeated herein for brevity.

Optionally, the computer program may be applied to the mobile terminal/terminal device in the implementations of the present disclosure. The computer program, when running on a computer, causes the computer to perform the corresponding processes implemented by the mobile terminal/terminal device in various methods in accordance with the implementations of the present disclosure, which will not be repeated herein for brevity.

A person of ordinary skill in the art may recognize that the elements and algorithm steps in various examples described in combination with the implementations disclosed herein can be implemented in electronic hardware, or a combination of computer software and electronic hardware. Whether these functions are implemented in hardware or software depends on the specific application and design constraints of the technical solution. Skilled artisans may use different methods to implement the described functions for each particular application, but such an implementation should not be considered to be beyond the scope of the present disclosure.

Those skilled in the art may clearly understand that for the sake of convenience and conciseness of description, the specific working processes of the systems, devices and units described above may be described with reference to the corresponding processes in the above method implementations and will not be repeated herein.

In several implementations provided by the present disclosure, it should be understood that the disclosed systems, devices and methods may be implemented in other ways. For example, the device implementations described above are only illustrative, for example, the division of the units is only a logical function division, and there may be other division manners in actual implementation. For example, multiple units or components may be combined or integrated into another system, or some features may be ignored or not executed. In addition, the shown or discussed coupling or direct coupling or communication connection between each other may be an indirect coupling or communication connection between devices or units through some interfaces, or may be in electrical, mechanical or other forms.

The unit described as a separate component may or may not be physically separated, and the component shown as a unit may or may not be a physical unit, i.e., it may be located in one place or may be distributed across multiple network units. Part or all of the units may be selected according to actual needs to achieve the purpose of the implementations.

In addition, various functional units in various implementations of the present disclosure may be integrated into one processing unit, or may exist physically separately, or two or more than two units may be integrated into one unit.

The function, if implemented in the form of a software functional unit and sold or used as an independent product, may be stored in a computer-readable storage medium. Based on such understanding, the technical solution of the present disclosure, in essence, or the part contributing to the prior art, or part of the technical solution, may be embodied in the form of a software product, which is stored in a storage medium, and includes several instructions for causing a computer device (which may be a personal computer, a server, or a network device, etc.) to perform all or part of the steps of the methods in the implementations. The aforementioned storage medium includes various media, such as a U disk, a mobile hard disk, a read-only memory (ROM), a random access memory (RAM), a magnetic disk, or an optical disk, which are capable of storing program codes.

What are described above are merely specific implementations of the present disclosure, but the protection scope of the present disclosure is not limited thereto. Any variation or substitution that may easily occur to a person skilled in the art within the technical scope disclosed by the present disclosure shall be included within the protection scope of the present disclosure. Therefore, the protection scope of the present disclosure shall be subject to the protection scope of the claims.

We claim:

1. A wireless communication method, comprising:
   sending, by a network device, first configuration information and/or second configuration information to a terminal device, wherein the first configuration information and/or second configuration information is used for configuring a sidelink configured grant, and the sidelink configured grant comprises transmission resources and/or transmission parameters of sidelink channels,
   wherein the sidelink channels comprise a sidelink feedback channel; wherein transmission resources and transmission parameters of the sidelink feedback channel comprise:
   time domain resource information of the sidelink feedback channel and frequency domain resource information of the sidelink feedback channel;
   wherein the time domain resource information of the sidelink feedback channel comprises period information of the sidelink feedback channel, wherein the period information is N, indicating that transmission resources for transmitting the sidelink feedback channel are included in one slot of every N slots.

2. The method of claim 1, wherein transmission resources and transmission parameters of the sidelink feedback channel further comprise at least one of following:
   a format of the sidelink feedback channel, whether sidelink feedback is supported, a feedback mode of sidelink feedback information, feedback granularity information of the sidelink feedback information, and a first threshold, wherein the first threshold is a distance threshold between a receiving terminal and a transmitting terminal or a sidelink reference signal received power (RSRP) threshold.

3. The method of claim 1, wherein the time domain resource information of the sidelink feedback channel further comprises at least one of following:
   a time offset of the sidelink feedback channel relative to the sidelink data channel, and information of a time domain symbol occupied by the sidelink feedback channel in a slot.

4. The method of claim 1, wherein the sidelink configured grant further comprises transmission resources and transmission parameters of a sidelink reference signal, wherein the transmission resources and transmission parameters of the sidelink reference signal comprise at least one of following:
   whether the sidelink reference signal is contained in the sidelink data channel, time domain resource information of the sidelink reference signal, and frequency domain resource information of the sidelink reference signal.

5. The method of claim 4, wherein the time domain resource information of the sidelink reference signal comprises information of a time domain symbol occupied by the sidelink reference signal,
   wherein the frequency domain resources of the sidelink reference signal comprise at least one of following:
   a frequency domain offset of the sidelink reference signal, size of frequency domain resources occupied by the sidelink reference signal, and a frequency domain density of the sidelink reference signal.

6. The method of claim 4, wherein the sidelink reference signal comprises at least one of following:
   a sidelink channel state information reference signal (CSI-RS) and a sidelink phase tracking reference signal (PT-RS).

7. The method of claim 1, wherein the sidelink channels further comprise at least one of following:
   a sidelink control channel, a sidelink data channel, and a sidelink broadcast channel.

8. The method of claim 7, wherein transmission resources and transmission parameters of the sidelink data channel comprise at least one of following:
   time domain resource information of the sidelink data channel, frequency domain resource information of the sidelink data channel, demodulation reference signal (DMRS) information of the sidelink data channel, a transmission scheme of the sidelink data channel, a number of transmission layers of the sidelink data channel, a modulation and coding scheme (MCS) of the sidelink data channel, a number of retransmissions of the sidelink data channel, redundancy version information of the sidelink data channel, a number of hybrid automatic repeat request (HARQ) processes supported by the sidelink data channel, power control information of the sidelink data channel, transmission block size of sidelink data capable of being transmitted on the sidelink data channel, a target address identifier of the sidelink data, priority information of the sidelink data, and delay information of the sidelink data.

9. The method of claim 8, wherein the time domain resource information of the sidelink data channel comprises at least one of following:
   period information of the sidelink data channel, information of a slot occupied by the sidelink data channel in each period, and information of a time domain symbol occupied by the sidelink data channel in a slot, wherein the frequency domain resource information of the sidelink data channel comprises at least one of following:

a starting frequency domain position of the sidelink data channel, and size of frequency domain resources occupied by the sidelink data channel, wherein the demodulation reference signal (DMRS) information of the sidelink data channel comprises at least one of following:

a pattern of a DMRS of the sidelink data channel, scrambling information of the DMRS, and information of a time domain symbol occupied by the DMRS.

10. The method of claim 7, wherein transmission resources and transmission parameters of the sidelink control channel comprise at least one of following:

time domain resource information of the sidelink control channel and frequency domain resource information of the sidelink control channel, wherein the time domain resource information of the sidelink control channel comprises at least one of following:

period information of the sidelink control channel, information of a slot occupied by the sidelink control channel in each period, and information of a time domain symbol occupied by the sidelink control channel in a slot, wherein the frequency domain resource information of the sidelink control channel comprises at least one of following:

a starting frequency domain position of the sidelink control channel, and size of frequency domain resources occupied by the sidelink control channel.

11. A network device, comprising: a processor and a transceiver, wherein the transceiver is configured to send first configuration information and/or second configuration information to a terminal device, wherein the first configuration information and/or second configuration information is used for configuring a sidelink configured grant, and the sidelink configured grant comprises transmission resources and/or transmission parameters of sidelink channels, wherein the sidelink channels comprise a sidelink feedback channel;

wherein transmission resources and transmission parameters of the sidelink feedback channel comprise:

time domain resource information of the sidelink feedback channel and frequency domain resource information of the sidelink feedback channel;

wherein the time domain resource information of the sidelink feedback channel comprises period information of the sidelink feedback channel, wherein the period information is N, indicating that transmission resources for transmitting the sidelink feedback channel are included in one slot of every N slots.

12. The network device of claim 11, wherein transmission resources and transmission parameters of the sidelink feedback channel further comprise at least one of following:

a format of the sidelink feedback channel, whether sidelink feedback is supported, a feedback mode of sidelink feedback information, feedback granularity information of the sidelink feedback information, and a first threshold, wherein the first threshold is a distance threshold between a receiving terminal and a transmitting terminal or a sidelink reference signal received power (RSRP) threshold.

13. The network device of claim 11, wherein the time domain resource information of the sidelink feedback channel further comprises at least one of following:

a time offset of the sidelink feedback channel relative to the sidelink data channel, and information of a time domain symbol occupied by the sidelink feedback channel in a slot.

14. The network device of claim 11, wherein the sidelink configuration grant further comprises transmission resources and transmission parameters of a sidelink reference signal, wherein the transmission resources and transmission parameters of the sidelink reference signal comprise at least one of following:

whether the sidelink reference signal is contained in the sidelink data channel, time domain resource information of the sidelink reference signal, and frequency domain resource information of the sidelink reference signal.

15. The network device of claim 14, wherein the time domain resource information of the sidelink reference signal comprises information of a time domain symbol occupied by the sidelink reference signal, wherein the frequency domain resources of the sidelink reference signal comprise at least one of following:

a frequency domain offset of the sidelink reference signal, size of frequency domain resources occupied by the sidelink reference signal, and a frequency domain density of the sidelink reference signal.

16. The network device of claim 14, wherein the sidelink reference signal comprises at least one of following:

a sidelink channel state information reference signal (CSI-RS) and a sidelink phase tracking reference signal (PT-RS).

17. The network device of claim 11, wherein the sidelink channels further comprise at least one of following: a sidelink control channel, a sidelink data channel, and a sidelink broadcast channel.

18. The network device of claim 17, wherein transmission resources and transmission parameters of the sidelink data channel comprise at least one of following:

time domain resource information of the sidelink data channel, frequency domain resource information of the sidelink data channel, demodulation reference signal (DMRS) information of the sidelink data channel, a transmission scheme of the sidelink data channel, a number of transmission layers of the sidelink data channel, a modulation and coding scheme (MCS) of the sidelink data channel, a number of retransmissions of the sidelink data channel, redundancy version information of the sidelink data channel, a number of hybrid automatic repeat request (HARQ) processes supported by the sidelink data channel, power control information of the sidelink data channel, transmission block size of sidelink data capable of being transmitted on the sidelink data channel, a target address identifier of the sidelink data, priority information of the sidelink data, and delay information of the sidelink data.

19. The network device of claim 18, wherein the time domain resource information of the sidelink data channel comprises at least one of following:

period information of the sidelink data channel, information of a slot occupied by the sidelink data channel in each period, and information of a time domain symbol occupied by the sidelink data channel in a slot, wherein the frequency domain resource information of the sidelink data channel comprises at least one of following:

a starting frequency domain position of the sidelink data channel, and size of frequency domain resources occupied by the sidelink data channel, wherein the demodulation reference signal (DMRS) information of the sidelink data channel comprises at least one of following:

a pattern of a DMRS of the sidelink data channel, scrambling information of the DMRS, and information of a time domain symbol occupied by the DMRS.

20. The network device of claim 17, wherein transmission resources and transmission parameters of the sidelink control channel comprise at least one of following:

time domain resource information of the sidelink control channel and frequency domain resource information of the sidelink control channel, wherein the time domain resource information of the sidelink control channel comprises at least one of following:

period information of the sidelink control channel, information of a slot occupied by the sidelink control channel in each period, and information of a time domain symbol occupied by the sidelink control channel in a slot, wherein the frequency domain resource information of the sidelink control channel comprises at least one of following:

a starting frequency domain position of the sidelink control channel, and size of frequency domain resources occupied by the sidelink control channel.

\* \* \* \* \*